US012342300B2

United States Patent
Cao et al.

(10) Patent No.: US 12,342,300 B2
(45) Date of Patent: Jun. 24, 2025

(54) SIMULTANEOUS TRANSMISSION IN MULTIPLE FREQUENCY SEGMENTS

(71) Applicant: Marvell Asia Pte Ltd, Singapore (SG)

(72) Inventors: Rui Cao, Sunnyvale, CA (US); Hongyuan Zhang, Fremont, CA (US); Liwen Chu, San Ramon, CA (US); Yan Zhang, Palo Alto, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/440,961

(22) Filed: Feb. 13, 2024

(65) Prior Publication Data

US 2024/0188008 A1   Jun. 6, 2024

Related U.S. Application Data

(63) Continuation of application No. 18/120,224, filed on Mar. 10, 2023, now Pat. No. 11,956,741, which is a
(Continued)

(51) Int. Cl.
*H04W 56/00* (2009.01)
*H04W 84/12* (2009.01)

(52) U.S. Cl.
CPC .......... *H04W 56/001* (2013.01); *H04W 84/12* (2013.01)

(58) Field of Classification Search
CPC . H04W 56/001; H04W 84/12; H04W 72/044; H04W 76/15
See application file for complete search history.

(56) References Cited

U.S. PATENT DOCUMENTS

| 8,320,356 B2 | 11/2012 | Nishio |
| 8,773,969 B1 | 7/2014 | Zhang et al. |

(Continued)

FOREIGN PATENT DOCUMENTS

| CN | 102811486 A | 12/2012 |
| CN | 104081708 A | 10/2014 |

(Continued)

OTHER PUBLICATIONS

US 11,902,922 B2, 02/2024, Cao et al. (withdrawn)
(Continued)

*Primary Examiner* — Kyaw Z Soe

(57) ABSTRACT

A communication device generates a first packet and a second packet. The first packet includes a first physical layer (PHY) preamble having: a first legacy signal field (L-SIG) having first duration information that indicates a first duration of the first packet; and first non-legacy signal field information having first modulation information that indicates a first modulation used in the first packet. The second packet includes a second PHY preamble having: a second L-SIG having second duration information that indicates a second duration of the second packet, wherein the second duration is different than the first duration; and second non-legacy signal field information having second modulation information that indicates a second modulation used in the second packet, wherein the second modulation is different than the first modulation. The communication device simultaneously transmits the first packet in a first frequency segment and the second packet in a second frequency segment.

21 Claims, 8 Drawing Sheets

Related U.S. Application Data continuation of application No. 17/527,004, filed on Nov. 15, 2021, now Pat. No. 11,606,765, which is a continuation of application No. 16/846,128, filed on Apr. 10, 2020, now Pat. No. 11,178,630.

(60) Provisional application No. 62/832,757, filed on Apr. 11, 2019.

(56) References Cited

U.S. PATENT DOCUMENTS

| | | |
|---|---|---|
| 8,787,385 B2 | 7/2014 | Liu et al. |
| 9,001,780 B2 | 4/2015 | Chen |
| 9,450,743 B1 | 9/2016 | Chu et al. |
| 9,876,614 B1 | 1/2018 | Sun et al. |
| 10,128,919 B2 | 11/2018 | Takeda et al. |
| 10,129,881 B2 | 11/2018 | Yang et al. |
| 10,257,806 B2 | 4/2019 | Chu et al. |
| 10,349,413 B2 | 7/2019 | Zhang et al. |
| 10,560,242 B2 | 2/2020 | Chun |
| 10,939,476 B1 | 3/2021 | Chu et al. |
| 11,178,630 B2 | 11/2021 | Cao et al. |
| 11,588,603 B2 | 2/2023 | Chu et al. |
| 11,606,765 B2 | 3/2023 | Cao |
| 11,611,462 B2 | 3/2023 | Chu et al. |
| 12,144,063 B2 | 11/2024 | Chu |
| 2004/0240426 A1 | 12/2004 | Haitao et al. |
| 2004/0264561 A1 | 12/2004 | Alexander et al. |
| 2006/0029099 A1 | 2/2006 | Jang |
| 2010/0208712 A1 | 8/2010 | Wax et al. |
| 2011/0249659 A1 | 10/2011 | Fontaine et al. |
| 2013/0195084 A1 | 8/2013 | Chen et al. |
| 2015/0098541 A1 | 4/2015 | Ben-Bassat |
| 2015/0146653 A1 | 5/2015 | Zhang et al. |
| 2015/0146812 A1 | 5/2015 | Chu et al. |
| 2015/0271002 A1 | 9/2015 | Oh et al. |
| 2016/0057657 A1 | 2/2016 | Seok |
| 2016/0112992 A1* | 4/2016 | Bhushan ............... H04W 72/04 370/330 |
| 2016/0157261 A1 | 6/2016 | Xiang |
| 2016/0212748 A1 | 7/2016 | Yang et al. |
| 2016/0241315 A1 | 8/2016 | Kwon |
| 2016/0249381 A1 | 8/2016 | Choi et al. |
| 2016/0302200 A1 | 10/2016 | Yang et al. |
| 2016/0323820 A1 | 11/2016 | Wong et al. |
| 2017/0048048 A1 | 2/2017 | Seok |
| 2017/0111853 A1 | 4/2017 | Hegde et al. |
| 2017/0149547 A1 | 5/2017 | Kim et al. |
| 2017/0181136 A1 | 6/2017 | Bharadwaj et al. |
| 2017/0188336 A1 | 6/2017 | Ahn et al. |
| 2017/0289933 A1 | 10/2017 | Segev et al. |
| 2017/0295571 A1 | 10/2017 | Chu et al. |
| 2017/0311204 A1 | 10/2017 | Cariou et al. |
| 2017/0311260 A1 | 10/2017 | Trainin et al. |
| 2017/0325178 A1 | 11/2017 | Verma et al. |
| 2017/0366329 A1 | 12/2017 | Cao et al. |
| 2018/0006681 A1* | 1/2018 | Bi ........................... H04B 1/715 |
| 2018/0020476 A1 | 1/2018 | Aijaz et al. |
| 2018/0115403 A1 | 4/2018 | Sakai et al. |
| 2018/0160429 A1 | 6/2018 | Seok |
| 2018/0205441 A1 | 7/2018 | Asterjadhi et al. |
| 2018/0206284 A1 | 7/2018 | Zhou et al. |
| 2018/0270772 A1 | 9/2018 | Ly |
| 2018/0288799 A1 | 10/2018 | Min et al. |
| 2018/0302858 A1 | 10/2018 | Son et al. |
| 2018/0324621 A1* | 11/2018 | Thangarasa ......... H04W 56/001 |
| 2019/0090278 A1 | 3/2019 | Chu et al. |
| 2019/0123863 A1 | 4/2019 | Zhang et al. |
| 2019/0124652 A1 | 4/2019 | Kim et al. |
| 2019/0182714 A1 | 6/2019 | Chu et al. |
| 2019/0182863 A1 | 6/2019 | Chu et al. |
| 2019/0190752 A1 | 6/2019 | Chen et al. |
| 2019/0238259 A1 | 8/2019 | Huang et al. |
| 2019/0349930 A1 | 11/2019 | Chu et al. |
| 2020/0037324 A1 | 1/2020 | Chu et al. |
| 2020/0107393 A1 | 4/2020 | Chu et al. |
| 2020/0304266 A1 | 9/2020 | Chu et al. |
| 2020/0404680 A1 | 12/2020 | Chu et al. |

FOREIGN PATENT DOCUMENTS

| | | |
|---|---|---|
| CN | 107079439 A | 8/2017 |
| EP | 2028809 A2 | 2/2009 |
| EP | 2717640 A1 | 4/2014 |
| EP | 2999252 A1 | 3/2016 |
| GB | 2501898 A | 11/2013 |
| JP | 2017152911 A | 8/2017 |
| JP | 2018007241 A | 1/2018 |
| JP | 2018527770 A | 9/2018 |
| WO | 2006000955 A1 | 1/2006 |
| WO | 2006118124 A1 | 11/2006 |
| WO | 2012026779 A2 | 3/2012 |
| WO | 2013168105 A1 | 11/2013 |
| WO | 2013179270 A1 | 12/2013 |
| WO | 2015099803 A1 | 7/2015 |
| WO | 2016072217 A1 | 5/2016 |
| WO | 2017026937 A1 | 2/2017 |
| WO | 2017111567 A2 | 6/2017 |
| WO | 2018203415 A1 | 11/2018 |

OTHER PUBLICATIONS

First Office Action in Chinese Application No. 202080038418.5 dated Jan. 10, 2024. (10 pages).
Non-Final Notice of Reasons for Allowance for Japanese Patent Application No. 2021-560025 mailed Nov. 22, 2022. (6 pages).
Search Report in Chinese Application No. 202080038418.5 dated Jan. 10, 2024. (3 pages).
Fischer et al., "IEEE P802.11—Wireless LANs—Disallowed Sub channels," doc. No. IEEE 802.11-18/0496r3, The Institute of Electrical and Electronics Engineers, DD. 1-11 (May 2018).
IEEE P802.11 ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages. (Feb. 2019).
IEEE P802.11 ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).
IEEE Std 802.11-REVmc™/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
Zhang et al., "EHT Technology Candidate Discussions," doc: IEEE 802.11-18/1161r0, The Institute of Electrical and Electronics Engineers, Inc., pp. 1-10 Jul. 8, 2018.
International Search Report and Written Opinion in International Patent Application No. PCT/US2020/027793, mailed Aug. 4, 2020 (13 pages).
Notice of Reasons for Refusal for Japanese Application No. 2023-113642, mailed Jul. 17, 2024. (6 pages).
Fang et al., "Functional Requirements for EHT Specification Framework," ZTE, doc: IEEE 802.11-2019/0105r1, Jan. 14, 2019. (17 pages).
Wu et al., "Follow up discussions on Throughput Enhancement," Samsung, doc.: IEEE 802.11-17/1184r1, Jul. 9, 2018. (19 pages).
Second Office Action in Chinese Application No. 202080038418.5, dated Sep. 28, 2024. (5 pages).
Choi et al., "View on EHT Objectives and Technologies," IEEE draft doc. IEEE 802.11-18/1171 r0, 13 pages (Jul. 8, 2018).

(56) References Cited

OTHER PUBLICATIONS

Chu et al., "Multiple Band Operation Discussion," IEEE draft doc. IEEE 802.11-19/0821 r0, vol. 802.11 EHT; 802.11be, 7 pages (May 14, 2019).
IEEE Std P802.11-REVmc™/D8.0, (Revision of IEEE Std 802.11™-2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, The Institute of Electrical and Electronics Engineers, Inc., 3774 pages (Aug. 2016).
Fischer et al., "IEEE P802.11—Wireless LANs—Disallowed Sub channels," doc. No. IEEE 802.11-18/0496r3, The Institute of Electrical and Electronics Engineers, 11 pages (May 2018).
IEEE P802.11ax ™M/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency Wlan," IEEE Computer Society, 620 pages (Feb. 2018).
IEEE P802.11ax ™M/D4.0, "Draft Standard for Information technology—Telecommunications and information exchange between systems Local and metropolitan area networks—Specific Requirements, Part 11: Wireless LAN Medium Access Control (MAC) and Physical Layer (PHY)Specifications, Amendment 1: Enhancements for High Efficiency Wlan," IEEE Computer Society, 746 pages (Feb. 2019).
IEEE Std 802.11ac™-2013 "IEEE Standard for Information Technology—Telecommunications and information exchange between systems—Local and metropolitan area networks-Specific requirements, Part 11: Wireless LAN Medium Access Control (MAC) and Physical Layer (PHY)specifications: Amendment 4: Enhancements for Very High Throughput for Operation in Bands below 6 GHZ," The Institute of Electrical and Electronics Engineers, Inc., pp. 1-425 (Dec. 18, 2013).
Orfanos et al., "A New Distributed Coordination Function for WLANs with Multiple Channel Structure," Proceedings of the 14th 1st Mobile and Wireless Communications Summit, Dresden, Germany, 5 pages (Jun. 19, 2005).
Seok et al., "EHT Multi-link Operation," IEEE draft doc. IEEE 802.11-19/0731 r0, vol. 802.11EHT, 802.11 be, 17 pages (May 15, 2019).
Seok et al., "Enhanced Multi-band/Multi-channel Operation," IEEE draft doc. IEEE 802.11-U.S. Appl. No. 19/076,641, vol. 802.11 EHT; 802.11be, No. 1, 13 pages (May 14, 2019).
Von Mulert et al., "Security threats and solutions in MANETs: A case study using AODV and Saodv," J. of Network and Computer Applications, vol. 35, pp. 1249-1259, Feb. 17, 2012.
Zhang et al., "EHT Technology Candidate Discussions," IEEE draft doc IEEE 802.11-18/1161 r0, 10 pages (Jul. 8, 2018).
Rejection Decision in Chinese Application No. 202080038418.5, dated Dec. 18, 2024. (10 pages).
Extended European Search Report for Application No. 25152871.7, mailed May 5, 2025 (8 pages).

* cited by examiner

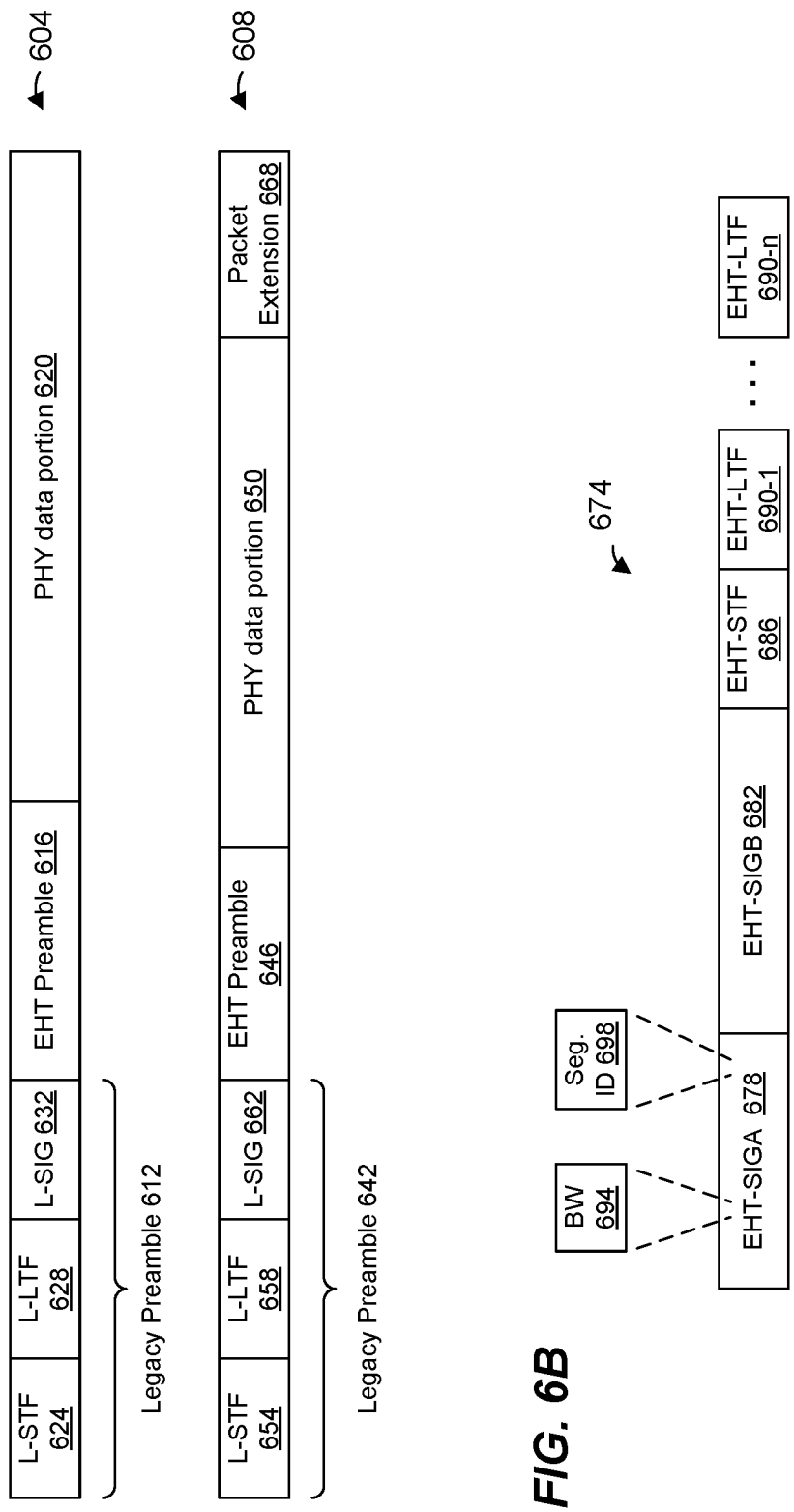

SIMULTANEOUS TRANSMISSION IN MULTIPLE FREQUENCY SEGMENTS

CROSS REFERENCES TO RELATED APPLICATIONS

The present application is a continuation of U.S. application Ser. No. 18/120,224, entitled "Simultaneous Transmissions in Multiple Frequency Segments," filed on Mar. 10, 2023, which is a continuation of U.S. application Ser. No. 17/527,004 (now U.S. Pat. No. 11,606,767), entitled "Simultaneous Transmissions in Multiple Frequency Segments," filed on Nov. 15, 2021, which is a continuation of U.S. patent application Ser. No. 16/846,128 (now U.S. Pat. No. 11,178,630), entitled "Simultaneous Transmissions in Multiple Frequency Segments," filed on Apr. 10, 2020, which claims the benefit of U.S. Provisional Patent Application No. 62/832,757, entitled "Extra High Throughput (EHT) Aggregated PLCP Protocol Data Unit (PPDU)," filed on Apr. 11, 2019. All of the applications referenced above are incorporated herein by reference in their entireties.

FIELD OF TECHNOLOGY

The present disclosure relates generally to wireless communication systems, and more particularly to data transmission and reception over multiple communication channels.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation 20 MHz sub-channels in different frequency segments (for example, separated by a gap in frequency) to form a single aggregate channel. Further, the IEEE 802.11be Standard may permit aggregation 20 MHz sub-channels in different radio frequency (RF) bands to form a single aggregate channel.

The current draft of the IEEE 802.11ax Standard (referred to herein as "the IEEE 802.11ax Standard" for simplicity) defines an "80+80" transmission mode in which a communication device simultaneously transmits in two 80 MHz channel segments within a single radio frequency (RF) band. The two 80 MHz channel segments may be separated in frequency within the single RF band. Transmissions in the two 80 MHz channel segments are synchronized, i.e., the transmissions begin at a same start time and end at a same end time.

SUMMARY

In an embodiment, a method for simultaneously transmitting in a plurality of frequency segments includes generating, at a communication device, a first packet for transmission in a first frequency segment. The first packet is generated to include a first physical layer (PHY) preamble having: a first legacy signal field (L-SIG) having first duration information that indicates a first duration of the first packet; and first non-legacy signal field information having first modulation information that indicates a first modulation used in the first packet. The method further includes generating, at the communication device, a second packet for transmission in a second frequency segment. The second packet is generated to include a second PHY preamble having: a second L-SIG having second duration information that indicates a second duration of the second packet, wherein the second duration is different than the first duration; and second non-legacy signal field information having second modulation information that indicates a second modulation used in the second packet, wherein the second modulation is different than the first modulation. The method further includes simultaneously transmitting, by the communication device, the first packet in the first frequency segment and the second packet in the second frequency segment.

In another embodiment, a wireless communication device comprises a wireless network interface device including: one or more integrated circuit (IC) devices; and a plurality of radio frequency (RF) radios including at least a first RF radio and a second RF radio, wherein the plurality of RF radios are implemented at least partially on the one or more IC devices. The one or more IC devices are configured to: generate a first packet for transmission in a first frequency segment, including generating a first PHY preamble of the first packet to include: i) a first L-SIG having first duration information that indicates a first duration of the first packet, and ii) first non-legacy signal field information having first modulation information that indicates a first modulation used in the first packet; generate a second packet for transmission in a second frequency segment, including generating a second PHY preamble of the second packet to include: i) a second L-SIG having second duration information that indicates a second duration of the second packet, wherein the second duration is different than the first duration, and ii) second non-legacy signal field information having second modulation information that indicates a second modulation used in the second packet, wherein the second modulation is different than the first modulation; and control the first RF radio and the second RF radio to simultaneously transmit the first packet in the first frequency segment and the second packet in the second frequency segment.

BRIEF DESCRIPTION OF THE DRAWINGS

FIG. 6A is a diagram of example packets transmitted in respective frequency segments, according to an embodiment.

FIG. 6B is a diagram of an example non-legacy preamble that is included in the example packets of FIG. 6A, according to some embodiments.

DETAILED DESCRIPTION

A next generation wireless local area network (WLAN) protocol (e.g., the IEEE 802.11be Standard, sometimes referred to as the Extremely High Throughput (EHT) WLAN Standard) may permit simultaneous transmissions in different channel segments. The different channel segments may be in a single radio frequency (RF) band or in different RF bands. The different channel segments may have a same bandwidth or different bandwidths.

The IEEE 802.11ax Standard permits synchronized transmissions (i.e., the transmissions begin at a same start time and end at a same end time) in two 80 MHz channel segments (referred to as an "80+80) transmission), and requires that the two 80 MHz channel segments be idle at the same time in order for the synchronized transmissions to proceed. Finding times when both 80 MHz channel segments are idle, however, is often difficult for many WiFi deployments, thus limiting the usefulness of the 80+80 transmission mode.

In some embodiments described below, a communication device is configured to transmit synchronously in different channel segments (e.g., the transmissions begin at a same start time) in some scenarios, and to transmit asynchronously in different channel segments (e.g., the transmissions are not required to begin at a same start time) in other scenarios. Transmitting asynchronously in the different channel segments does not require that the different channel segments be idle at a same time, at least in some embodiments, thus permitting simultaneous use of the different channel segments more frequently as compared to a communication system that always requires that transmissions in different channel segments be synchronous (e.g., the transmissions begin at a same start time) and that the different channel segments be idle at a same time, at least in some embodiments and/or situations.

Figure 1:
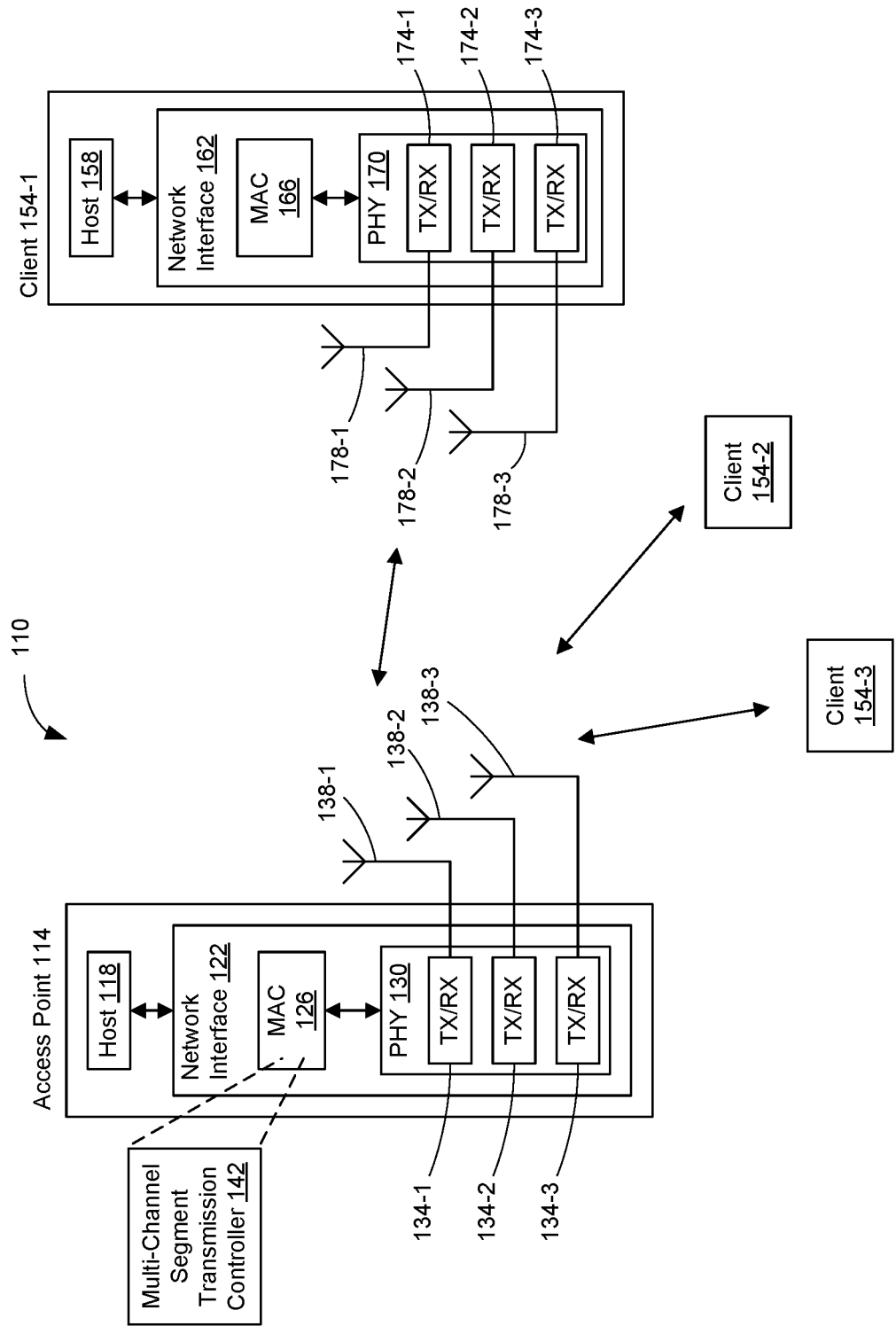
FIG. 1 is a block diagram of an example wireless local area network (WLAN) in which respective RF signals are simultaneously transmitted in respective frequency segments.

FIG. 1 is a block diagram of an example wireless local area network (WLAN) 110, according to an embodiment. The WLAN 110 includes an access point (AP) 114 that comprises a host processor 118 coupled to a network interface device 122. The network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), aggregate MPDUs (A-MPDUs), etc., and provide the MAC layer data units to the PHY processor 130. MPDUs and A-MPDUs exchanged between the MAC processor 126 and the PHY processor 130 are sometimes referred to as physical layer convergence procedure (PLCP) (or simply "PHY") service data units (PSDUs).

The PHY processor 130 may be configured to receive MAC layer data units (or PSDUs) from the MAC processor 126 and encapsulate the MAC layer data units (or PSDUs) to generate PHY data units such as PLCP (or "PHY") protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a multi-channel segment transmission controller 142 that is configured to determine when transmissions in different channel segments are to be transmitted synchronously (e.g., the transmissions begin at a same start time), and when transmissions in different channel segments can be transmitted asynchronously (e.g., the transmissions are not required to begin at a same start time), according to an embodiment. When transmissions in different channel segments are to be transmitted synchronously, the multi-channel segment transmission controller 142 prompts the PHY processor 130 to begin the transmissions in the different channel segments at a same time, according to some embodiments. When transmissions in different channel segments are to be transmitted asynchronously, the multi-channel segment transmission controller 142 prompts the PHY processor 130 to begin the transmissions in the different channel segments at different times, according to some embodiments.

In an embodiment, the multi-channel segment transmission controller 142 is implemented by a processor executing machine readable instructions stored in a memory, where the machine readable instructions cause the processor to perform acts described in more detail below. In another embodiment, the multi-channel segment transmission controller 142 additionally or alternatively comprises hardware circuitry that is configured to perform acts described in more detail below. In some embodiments, the hardware circuitry comprises one or more hardware state machines that are configured to perform acts described in more detail below.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In some embodiments, the MAC processor 166 includes a multi-channel segment transmission controller (not shown) the same as or similar to the multi-channel segment transmission controller 142 of the AP 114. For example, the client station 154-1 is configured transmit synchronously in different channel segments (e.g., the transmissions begin at a same start time) in some scenarios, and to transmit asynchronously in different channel segments (e.g., the transmissions are not required to begin at a same start time) in other scenarios, according to some embodiments.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, multiple different frequency bands within the RF spectrum are employed for signal transmissions within the WLAN 110. In an embodiment, different communication devices (i.e., the AP 114 and the client stations 154) may be configured for operation in different frequency bands. In an embodiment, at least some communication devices (e.g., the AP 114 and the client station 154) in the WLAN 110 may be configured for simultaneous operation over multiple different frequency bands. Exemplary frequency bands include, a first frequency band corresponding to a frequency range of approximately 2.4 GHz-2.5 GHZ ("2 GHz band"), and a second frequency band corresponding to a frequency range of approximately 5 GHZ-5.9 GHZ ("5 GHz band") of the RF spectrum. In an embodiment, one or more communication devices within the WLAN may also be configured for operation in a third frequency band in the 6 GHz-7 GHz range ("6 GHz band"). Each of the frequency bands comprise multiple component channels which may be combined within the respective frequency bands to generate channels of wider bandwidths, as described above. In an embodiment corresponding to multi-channel segment operation over a first channel segment and a second channel segment, the first channel segment and the second channel segment may be in separate frequency bands, or within a same frequency band. In some embodiments, at least one communication device (e.g., at least the AP 114) in the WLAN 110 is configured for simultaneous operation over any two of the 2 GHz band, the 5 GHz band, and the 7 GHZ band. In some embodiments, at least one communication device (e.g., at least the AP 114) in the WLAN 110 is configured for simultaneous operation over all three of the 2 GHz band, the 5 GHz band, and the 7 GHz band.

Figure 2A:
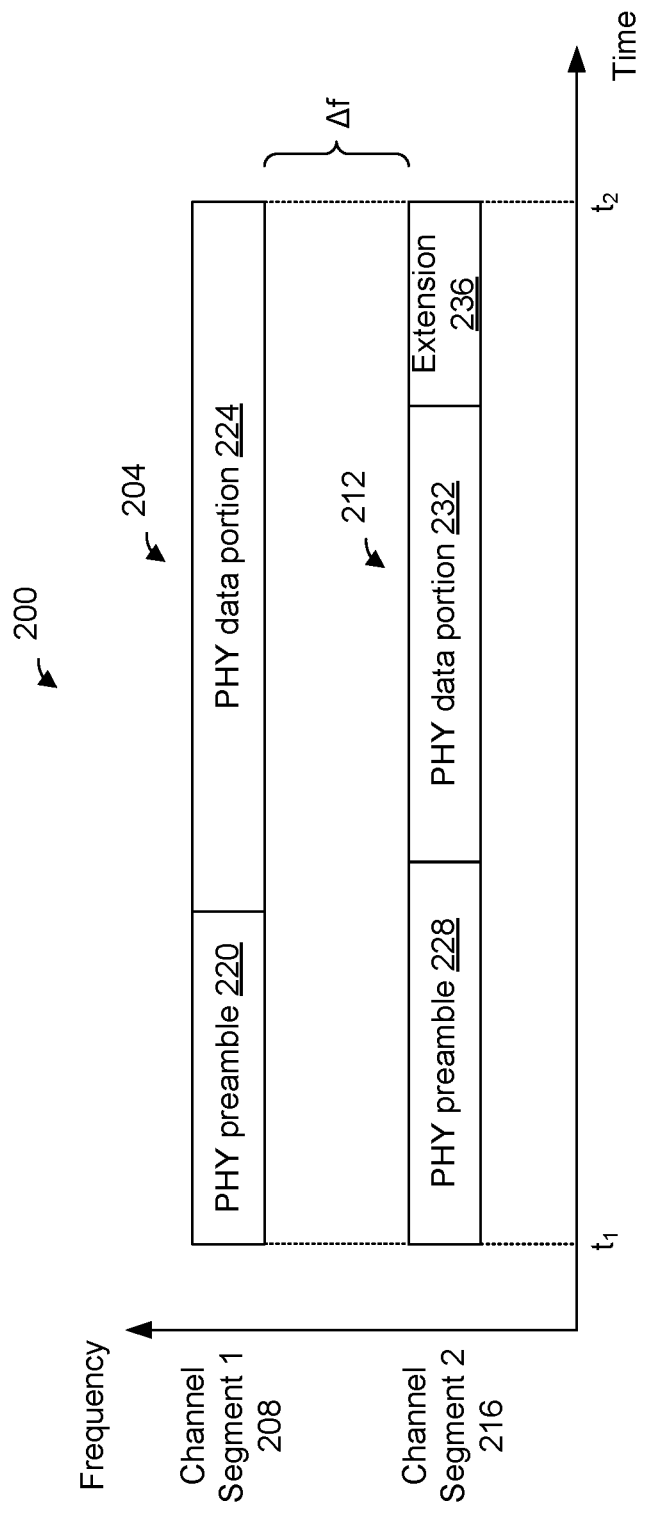
FIG. 2A is a diagram of an example synchronized transmission over different channel segments, according to an embodiment.

FIG. 2A is a diagram of an example synchronized transmission 200 over different channel segments, according to an embodiment. In an embodiment, the transmission 200 is generated and transmitted by the network interface device 122 (FIG. 1) to one or more client stations 154 (e.g., the client station 154-1). In another embodiment, the transmission 200 is generated and transmitted by the network interface device 162 (FIG. 1) to the AP 114.

In an embodiment, the transmission 200 corresponds to a single user (SU) transmission that is generated and transmitted to a single communication device. In another embodiment, the transmission 200 corresponds to a multi-user (MU) transmission that includes data for multiple communication devices (e.g., multiple ones of the client stations 154). For example, in an embodiment, the MU transmission 200 is an OFDMA transmission. In another embodiment, the MU transmission 200 is an MU-MIMO transmission.

The transmission 200 comprises a first RF signal 204 in a first channel segment 208 and a second RF signal 212 in a second channel segment 216. The first RF signal 204 corresponds to a first PPDU and the second RF signal 212 corresponds to a second PPDU, according to an embodiment. The first signal comprises a PHY preamble 220 and a PHY data portion 224. The second signal 212 comprises of a PHY preamble 228, a data portion 232, and optional padding 236. The transmission 200 is synchronized such that transmission of the first signal 204 and the second signal 212 start at a same time $t_1$. In some embodiments, the first signal 204 and the second signal 212 also end at a same time $t_2$.

In some embodiments, the PHY preamble 220 and the PHY preamble 228 are not required to have a same duration and/or to end at a same time. In other embodiments, the PHY preamble 220 and the PHY preamble 228 are required to have a same duration and/or to end at a same time.

In an embodiment in which the second RF signal 212 would otherwise have a shorter duration than the first RF signal 204, the PHY data portion 232 is appended with a packet extension field 236 so that transmission of the signal 212 ends at $t_2$. In an embodiment, the packet extension field 236 includes arbitrary data that is ignored by receivers.

In another embodiment in which the second RF signal 212 has a shorter duration than the first RF signal 204, duration information in a MAC header (not shown) within the PHY data portion 232 is set to indicate that the transmission of the signal 212 ends at $t_2$, which causes another communication device to set a network allocation vector (NAV) timer of the other communication device to a value that indicates transmission of the signal 212 will end at $t_2$.

In another embodiment in which the second RF signal 212 would otherwise have a shorter duration than the first RF signal 204, padding information is included in the PHY data portion 232 so that transmission of the signal 212 ends at $t_2$.

Example formats of the PHY preamble 220 and the PHY preamble 228 are described in more detail below. In an embodiment, at least a portion of the PHY preamble 220 and at least a portion of the PHY preamble 228 include different information. In another embodiment, at least a portion of the PHY preamble 220 and at least a portion of the PHY preamble 228 have the same structure and/or include the same information. In some embodiments, at least a portion of the PHY preamble 220 and at least a portion of the PHY preamble 228 are identical.

In an embodiment in which the first channel segment 208 comprises multiple component channels (e.g., 20 MHz subchannels), at least a portion of the PHY preamble 220 (e.g., a legacy portion) is generated by generating a field corresponding to one component channel and duplicating the field over one or more other component channels corresponding to the first channel segment 208. In an embodiment in which the second channel segment 216 comprises multiple component channels (e.g., 20 MHz subchannels), at least a portion of the PHY preamble 228 (e.g., a legacy portion) is generated by generating a field corresponding to one component channel and duplicating the field over one or more other component channels corresponding to the second channel segment 216.

In various embodiments, the first channel segment 208 and the second channel segment 216 are in different RF bands or are co-located in a same RF band. In an embodiment, the RF band(s) correspond to the 2 GHz band, the 5 GHz band, and the 6 GHz bands, as described above. The first channel segment 208 and the second channel segment 216 may each be comprised of one or more component channels. In an embodiment, a frequency bandwidth of the first channel segment 208 (i.e., a frequency bandwidth of the first signal 204) is different than a frequency bandwidth of the second channel segment 216 (i.e., a frequency bandwidth of the second signal 212). In another embodiment, the frequency bandwidth of the first channel segment 208 is the same as the frequency bandwidth of the second channel segment 216.

In an embodiment, the first channel segment 208 and the second channel segment 216 are separated in frequency. For example, a gap in frequency exists between the first channel segment 208 and the second channel segment 216. In various embodiments, the gap is at least 500 kHz, at least 1 MHz, at least 5 MHz, at least 20 MHz, etc.

In some embodiments, the first signal 204 is transmitted via a first number of spatial or space-time streams (hereinafter referred to as "spatial streams" for brevity), and the second signal 212 is transmitted via a second number of spatial streams that is different than the first number of spatial streams. In one such embodiment, the PHY preamble 220 includes a first number of LTFs corresponding to the first number of spatial streams, and the PHY preamble 228 includes a second number of LTFs (different than the first number of LTFs) corresponding to the second number of spatial streams. In another such embodiment, the PHY preamble 220 and the PHY preamble 228 comprise a same number of LTFs even when the first signal 204 is transmitted via a first number of spatial streams and the second signal 212 is transmitted via a second number of spatial streams that is different than the first number of spatial streams. In an embodiment, the same number of LTFs correspond to one of the first signal 204 and the second signal 212 with the larger number of spatial streams. In other embodiments, the first signal 204 and the second signal 212 are transmitted via a same number of spatial streams.

In an embodiment, at least the PHY data portion 224 and at least the PHY data portion 232 employ different encoding schemes and/or modulation schemes. As an example, in an embodiment, the PHY data portion 224 is generated using a first MCS and the PHY data portion 432 is generated using a second, different MCS. In other embodiments, the PHY data portion 224 and the PHY data portion 232 are generated using a same MCS.

In an embodiment, the transmission 200 corresponds to a single PPDU, where a first frequency portion of the single PPDU is transmitted via the first channel 208 and a second frequency portion of the single PPDU is transmitted via the second channel 216. In another embodiment, the first signal 204 corresponds to a first PPDU and the second signal 212 corresponds to a second PPDU. In an embodiment, each of the PHY preambles 220 and 228, and the PHY data portions 224 and 232, are comprised of one or more OFDM symbols.

Figure 2B:
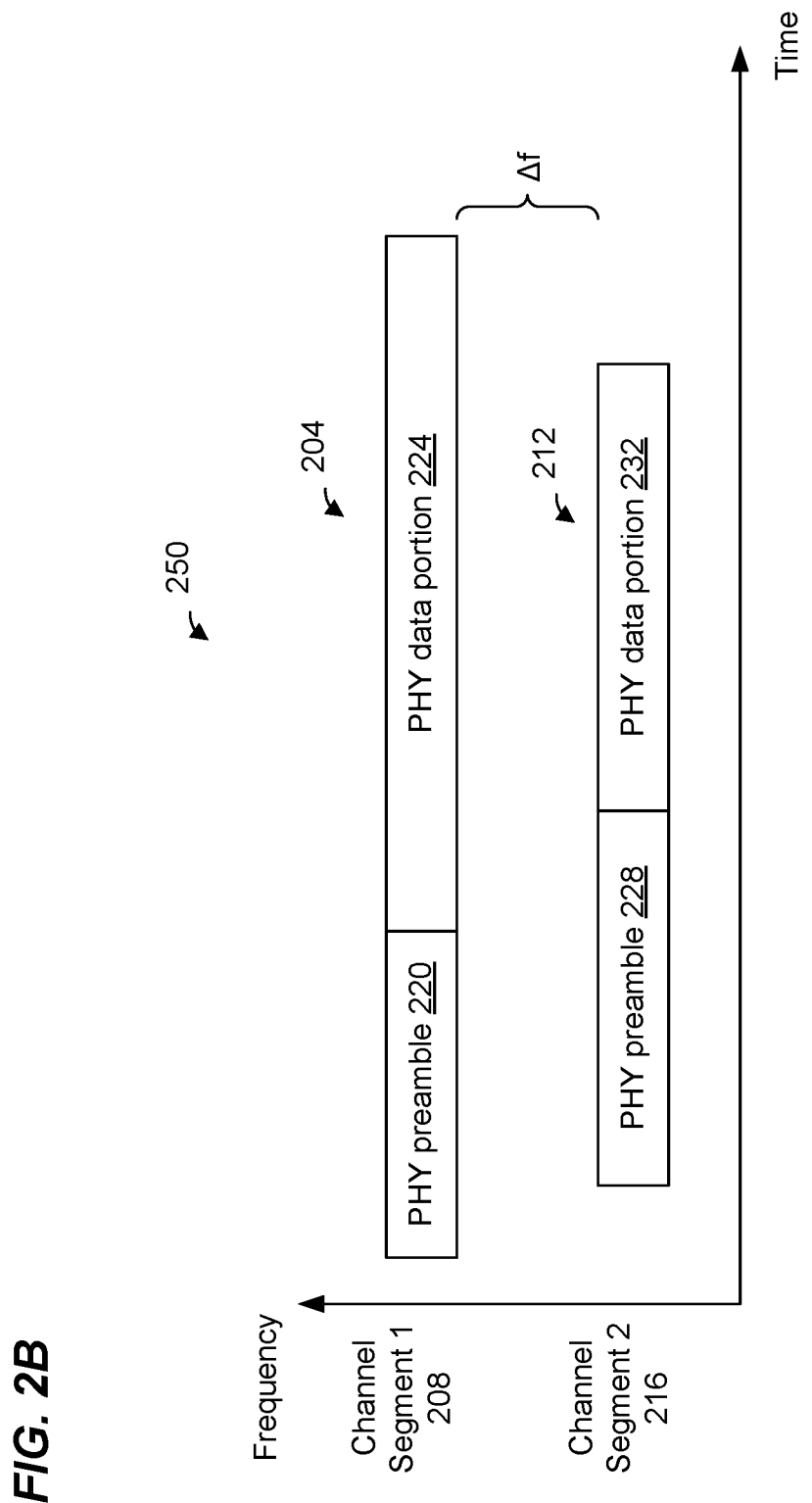
FIG. 2B is a diagram of an example unsynchronized transmission over different channel segments, according to an embodiment.

FIG. 2B is a diagram of an example unsynchronized transmission 250 over different channel segments, according to an embodiment. In an embodiment, the transmission 250 is generated and transmitted by the network interface device 122 (FIG. 1) to one or more client stations 154 (e.g., the client station 154-1). In another embodiment, the transmission 250 is generated and transmitted by the network interface device 162 (FIG. 1) to the AP 114.

The unsynchronized transmission 250 is similar to the synchronized transmission 200 of FIG. 2A, and like-numbered elements are not described in detail for brevity. Unlike the synchronized transmission 200 of FIG. 2A, transmission of the signal 204 and transmission of the signal 212 begin at different times. Additionally, transmission of the signal 204 and transmission of the signal 212 end at different times, according to some embodiments. Further, the signal 212 does not include the packet extension field 236 of FIG. 2A, according to some embodiments.

Referring now to FIGS. 1 and 2A-B, a communication device (e.g., the AP 114, the client station 154-1, etc.) is configured to generate and transmit a synchronized transmission such as the transmission 200 (FIG. 2A) at some times (and/or in some scenarios), and to generate and transmit an unsynchronized transmission such as the transmission 250 (FIG. 2B) at other times (and/or in other scenarios), according to some embodiments. For example, transmitting an unsynchronized transmission in different channel segments does not require that the different channel segments be idle at a same time, at least in some embodiments, thus permitting simultaneous use of the different channel segments when a synchronized transmission may not be possible (e.g., when the synchronized transmission requires that the different channel segments are idle at the same time), at least in some embodiments and/or situations. On the other hand, unsynchronized transmissions in the different channel segments may not be permitted in some scenarios, such as when the different channel segments are relatively close in frequency, at least in some embodiments and/or situations.

Figure 3A:
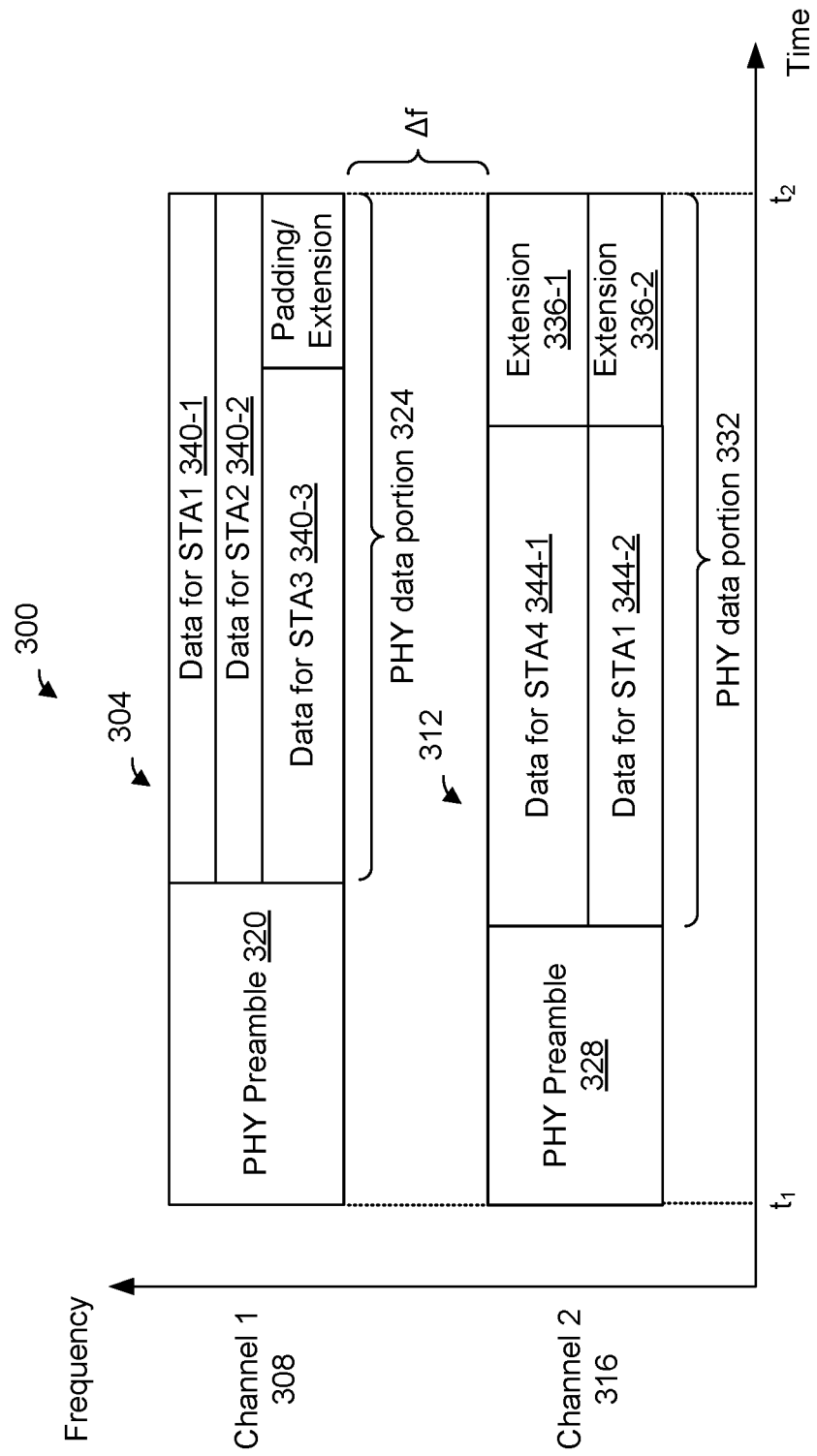
FIG. 3A is a diagram of an example synchronized downlink multi-user (MU) orthogonal frequency division multiple access (OFDMA) transmission over different channel segments, according to an embodiment.

FIG. 3A is a diagram of an example synchronized downlink MU OFDMA transmission 300 over different channel segments, according to an embodiment. In an embodiment, the transmission 300 is generated and transmitted by the network interface device 122 (FIG. 1) to a plurality of client stations 154.

The OFDMA transmission 300 comprises a first RF signal 304 in a first channel segment 308 and a second RF signal 312 in a second channel segment 316. In various embodiments, the first channel segment 308 and the second channel segment 316 are similar to the first channel segment 208 and the second channel segment 216, respectively, as described above with reference FIG. 2A. The transmission 300 is synchronized such that the first RF signal 304 and the second RF signal 312 start at a same time $t_1$. In some embodiments, the first RF signal 304 and the second RF signal 312 end at a same time $t_2$.

The first signal 304 comprises a PHY preamble 320 and a PHY data portion 324. The second signal 312 comprises of a PHY preamble 328 and a data portion 332. In some embodiments, the PHY preamble 320 and the PHY preamble 328 are not required to have a same duration and/or to end at a same time. In other embodiments, the PHY preamble 320 and the PHY preamble 328 are required to have a same duration and/or to end at a same time.

In an embodiment in which the second RF signal 312 would otherwise have a shorter duration than the first RF signal 304, the PHY data portion 332 is appended with a packet extension field 336 so that transmission of the signal 312 ends at $t_2$. In an embodiment, the packet extension field 336 includes arbitrary data that is ignored by receivers.

In another embodiment in which the second RF signal 312 has a shorter duration than the first RF signal 304, duration information in a MAC header (not shown) within the PHY data portion 332 is set to indicate that the transmission of the signal 312 ends at $t_2$, which causes another communication device to set a NAV timer of the other communication device to a value that indicates transmission of the signal 212 will end at $t_2$.

In another embodiment in which the second RF signal 312 would otherwise have a shorter duration than the f first RF signal 304, padding information is included in the PHY data portion 332 so that transmission of the signal 312 ends at $t_2$.

In an embodiment, the PHY preamble 320 and the PHY preamble 328 are formatted in a manner similar to the PHY preamble 204. Example formats of the PHY preamble 320 and the PHY preamble 328 are described in more detail below. In an embodiment, at least a portion of the PHY preamble 320 and at least a portion of the PHY preamble 328 include different information. In another embodiment, at least a portion of the PHY preamble 320 and at least a portion of the PHY preamble 328 have the same structure and/or include the same information. In some embodiments, at least a portion of the PHY preamble 320 and at least a portion of the PHY preamble 328 are identical.

In an embodiment in which the first channel segment 308 comprises multiple component channels (e.g., 20 MHz subchannels), at least a portion of the PHY preamble 320 (e.g., a legacy portion) is generated by generating a field corresponding to one component channel and duplicating the field over one or more other component channels corresponding to the first channel segment 308. In an embodiment in which the second channel segment 316 comprises multiple component channels, at least a portion of the PHY preamble 328 (e.g., a legacy portion) is generated by generating a field corresponding to one component channel and duplicating the field over one or more other component channels corresponding to the second channel segment 316.

In various embodiments, the first channel segment 308 and the second channel segment 316 are in different RF bands or are co-located in a same RF band. In an embodiment, the RF band(s) correspond to the 2 GHz band, the 5 GHz band, and the 6 GHz bands, as described above. The first channel segment 308 and the second channel segment 316 may each be comprised of one or more component channels. In an embodiment, a frequency bandwidth of the first channel segment 308 (i.e., a frequency bandwidth of the first signal 304) is different than a frequency bandwidth of the second channel segment 316 (i.e., a frequency bandwidth of the second signal 212). In another embodiment, the frequency bandwidth of the first channel segment 308 is the same as the frequency bandwidth of the second channel segment 316.

In an embodiment, the first communication channel 308 and the second communication channel 316 are separated in frequency. For example, a gap in frequency exists between the first communication channel 308 and the second communication channel 316. In various embodiments, the gap is at least 500 kHz, at least 1 MHz, at least 5 MHz, at least 20 MHz, etc.

In some embodiments, the first signal 304 is transmitted via a first number of spatial streams, and the second signal 312 is transmitted via a second number of spatial streams that is different than the first number of spatial streams. In one such embodiment, the PHY preamble 320 includes a first number of LTFs corresponding to the first number of spatial streams, and the PHY preamble 328 includes a second number of LTFs (different than the first number of LTFs) corresponding to the second number of spatial streams. In another such embodiment, the PHY preamble 320 and the PHY preamble 328 comprise a same number of LTFs even when the first signal 304 is transmitted via a first number of spatial streams and the second signal 312 is transmitted via a second number of spatial streams that is different than the first number of spatial streams. In an embodiment, the same number of LTFs correspond to one of the first signal 304 and the second signal 312 with the larger number of spatial streams. In other embodiments, the first signal 304 and the second signal 312 are transmitted via a same number of spatial streams.

In an embodiment, at least a PHY data portion 324 and at least a PHY data portion 332 employ different encoding schemes and/or modulation schemes.

In an embodiment, the transmission 300 corresponds to a single PPDU, where a first frequency portion of the single PPDU is transmitted via the first channel 308 and a second frequency portion of the single PPDU is transmitted via the second channel 316. In another embodiment, the first signal 304 corresponds to a first PPDU and the second signal 312 corresponds to a second PPDU. In an embodiment, each of the PHY preambles 320 and 328, and the PHY data portions 324 and 332, are comprised of one or more OFDM symbols.

The PHY data portion 324 and the PHY data portion 332 include respective frequency multiplexed data for respective client stations 154. Individual data within the data portion 324 are transmitted to corresponding client stations 154 in corresponding allocated frequency resource units (RUS) 340. Individual data within the data portion 332 are transmitted to corresponding client stations 154 in corresponding allocated RUs 344. In various embodiments, transmitted signals corresponding to some or all of RUs 340/344 use different encoding schemes and/or modulation schemes. As an example, transmitted signals corresponding to the RU 340-1 and the RU 344-1 are generated using different MCSs and/or different numbers of spatial/space-time streams, etc. In an embodiment in which a duration of data in an RU 344 is shorter than a duration of the PHY data portion 324, padding is added to the data in the RU 344 to ensure the duration of the PHY data portions in both communication channels are the same.

In at least some embodiments, at least some of the client stations 154 are configured to operate only in one RF band. In such embodiments, RUs are allocated to the client station 154 only within the RF band in which the client station 154 is configured to operate. As an illustrative embodiment, STA2 and STA3 are configured to operate only in a first RF band. Hence, data corresponding to STA2 and STA3 is transmitted over RUs within the first channel segment 308, which is within the first RF band in an embodiment. Similarly, STA4 is configured to operate only in a second RF band. Hence, data corresponding to STA4 is transmitted over RUs within the second channel segment 316, which is within the second RF band in an embodiment. On the other hand, STA1 is configured for operation in both the first RF band and the second RF band. Hence, data corresponding to STA1 may be transmitted in RUs located in either or both of the first channel segment 308 and the second channel segment 316.

Figure 3B:
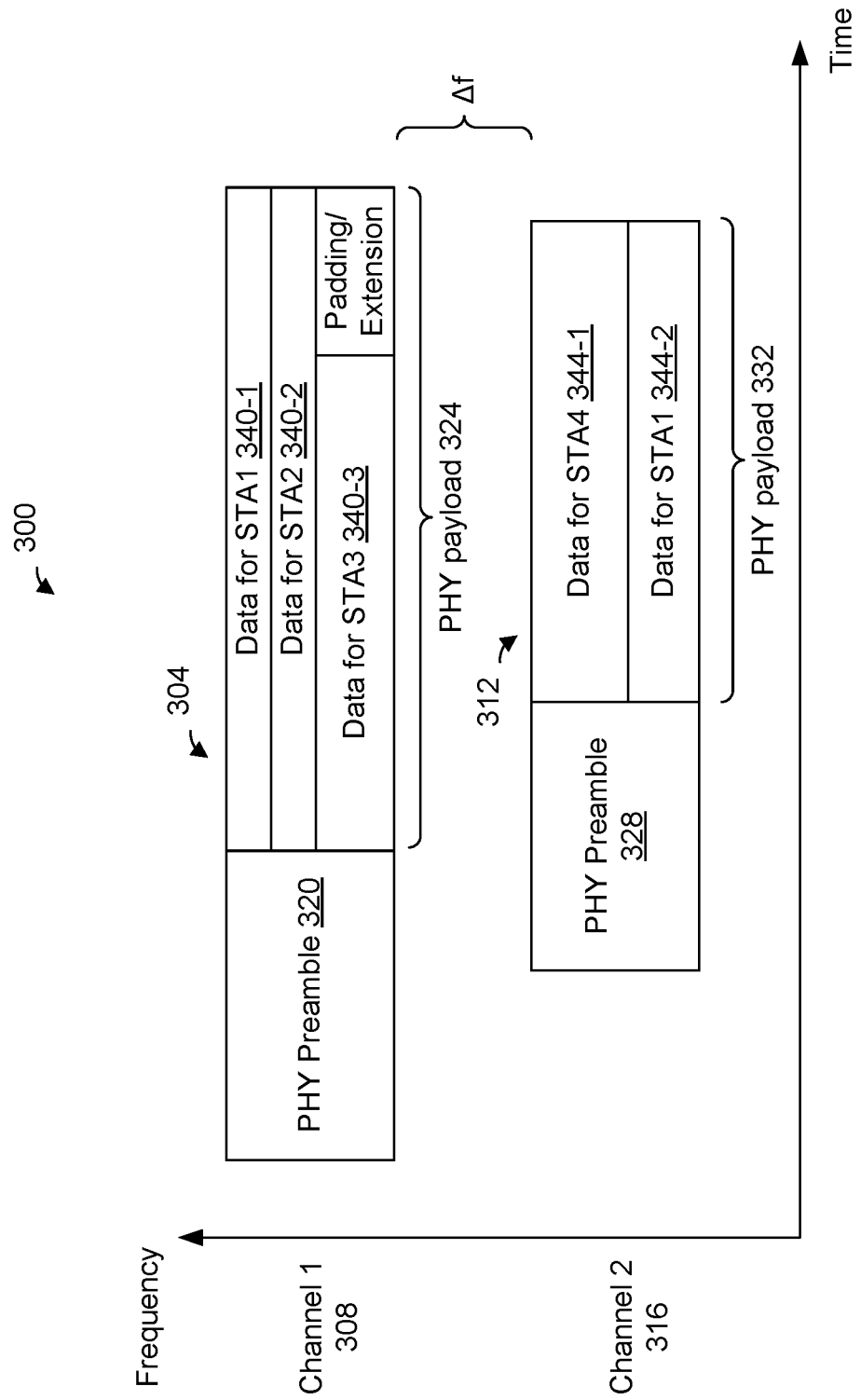
FIG. 3B is a diagram of an example unsynchronized MU OFDMA transmission over different channel segments, according to an embodiment.

FIG. 3B is a diagram of an example unsynchronized MU OFDMA transmission 350 over different channel segments, according to an embodiment. In an embodiment, the transmission 350 is generated and transmitted by the network interface device 122 (FIG. 1) to one or more client stations 154 (e.g., the client station 154-1). In another embodiment, the transmission 350 is generated and transmitted by the network interface device 162 (FIG. 1).

The unsynchronized transmission 350 is similar to the synchronized transmission 300 of FIG. 2A, and like-numbered elements are not described in detail for brevity. Unlike the synchronized transmission 300 of FIG. 3A, transmission of the signal 304 and transmission of the signal 312 begin at different times. Additionally, transmission of the signal 304 and transmission of the signal 312 end at different times, according to some embodiments. Further, the signal 312 does not include the packet extension field 336 of FIG. 3A, according to some embodiments.

Referring now to FIGS. 1 and 3A-B, a communication device (e.g., the AP 114, the client station 154-1, etc.) is configured to generate and transmit a synchronized transmission such as the transmission 300 (FIG. 3A) at some times (and/or in some scenarios), and to generate and transmit an unsynchronized transmission such as the transmission 350 (FIG. 3B) at other times (and/or in other scenarios), according to some embodiments.

Figure 4:
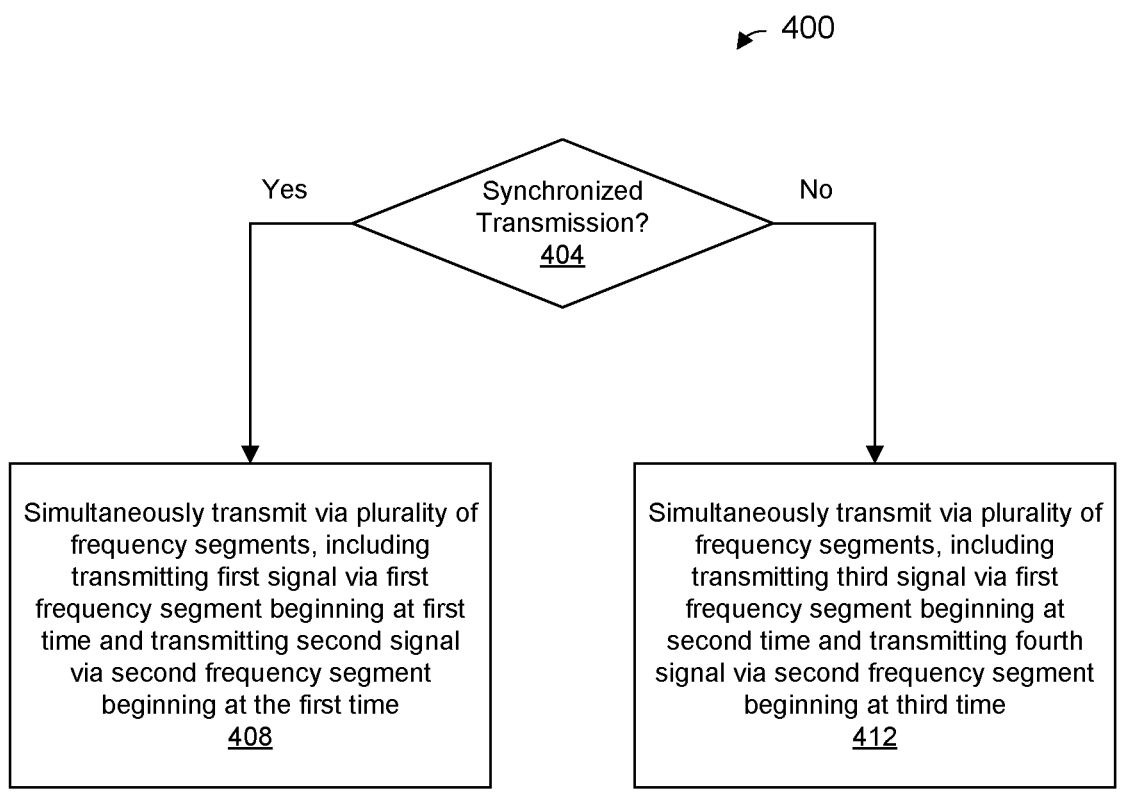
FIG. 4 is a flow diagram of an example method for transmitting via multiple frequency segments in a wireless communication network, according to an embodiment.

FIG. 4 is a flow diagram of an example method 400 for transmitting via multiple frequency segments in a wireless communication network, according to an embodiment. The AP 114 of FIG. 1 is configured to implement the method 400, according to some embodiments. The client station 154-1 of FIG. 1 is additionally or alternatively configured to implement the method 400, according to other embodiments. The method 400 is described in the context of the AP 114 merely for explanatory purposes and, in other embodiments, the method 400 is implemented by the client station 154-1 or another suitable communication device, according to various embodiments.

At block 404, a communication device determines (e.g., the AP 114 determines, the network interface 122 determines, the MAC processor 126 determines, the multi-channel segment transmission controller 142 determines, etc.) whether simultaneous respective transmissions in a plurality of frequency segments are to be synchronized (e.g., the simultaneous respective transmissions are to begin at a same time). In various embodiments, the plurality of frequency segments are contiguous in frequency, or one or more adjacent pairs of frequency segments are separated in frequency by a respective gap in frequency. In various embodiments, each frequency segment in the plurality of frequency segments spans a same frequency bandwidth, or frequency segments in the plurality of frequency segments span different frequency bandwidths. In various embodiments, two or more frequency segments in the plurality of frequency segments are in a same RF band (e.g., the 2 GHz band, the 5 GHz band, the 6 GHz band, etc.), or two or more frequency segments in the plurality of frequency segments are in different RF bands.

In various embodiments, determining whether the simultaneous respective transmissions are to be synchronized at block 404 is based on a variety of parameters and/or factors. For example, in one embodiment, determining whether the simultaneous respective transmissions are to be synchronized at block 404 is based on a bandwidth of a frequency gap between adjacent frequency segments in the plurality of frequency segments. For instance, when a frequency gap between a first frequency segment and a second frequency segment is less than a threshold, the communication device determines (e.g., the AP 114 determines, the network interface 122 determines, the MAC processor 126 determines, etc.) at block 404 that the simultaneous transmissions in the first frequency segment and the second frequency segment are to be synchronized (e.g., the simultaneous respective transmissions are to begin at a same time); whereas when the frequency gap between the first frequency segment and the second frequency segment is greater than the threshold, the communication device determines (e.g., the AP 114 determines, the network interface 122 determines, the MAC processor 126 determines, etc.) at block 404 that the simultaneous transmissions in the first frequency segment and the second frequency segment are not required to be synchronized, according to an illustrative embodiment. When the first frequency segment and the second frequency segment are relatively close in frequency (e.g., the frequency gap between the first frequency segment and the second frequency segment is less than the threshold), an amount (or probability) of inter-channel interference is relatively high, and thus requiring synchronized transmissions improves performance (e.g., overall throughput); whereas when the first frequency segment and the second frequency segment are relatively far apart in frequency (e.g., the frequency gap between the first frequency segment and the second frequency segment is greater than the threshold), the amount (or probability) of inter-channel interference is relatively low, and thus requiring synchronized transmissions is not required, according to an illustrative embodiment.

As another example, in another embodiment, determining whether the simultaneous respective transmissions are to be synchronized at block 404 is additionally or alternatively based on bandwidth capabilities of one or more other communication devices that are to receive the simultaneous respective transmissions. For instance, in response to the AP 114 determining (e.g., the network interface 122 determines, the MAC processor 126 determines, etc.) that one or more of the other communication devices are not capable of receiving unsynchronized transmissions, the AP 114 determines at block 404 that the simultaneous respective transmissions in the plurality of frequency segments are to be synchronized, according to an illustrative embodiment.

As another example, determining whether the simultaneous respective transmissions are to be synchronized at block 404 is based on an overall frequency bandwidth of the plurality of frequency segments in the plurality of frequency segments. For instance, when the overall bandwidth is less than a threshold, the communication device determines (e.g., the AP 114 determines, the network interface 122 determines, the MAC processor 126 determines, etc.) at block 404 that the simultaneous transmissions in the first frequency segment and the second frequency segment are to be synchronized (e.g., the simultaneous respective transmissions are to begin at a same time); whereas when the overall bandwidth is greater than the threshold, the communication device determines (e.g., the AP 114 determines, the network interface 122 determines, the MAC processor 126 determines, etc.) at block 404 that the simultaneous transmissions in the first frequency segment and the second frequency segment are not required to be synchronized, according to an illustrative embodiment. When the overall bandwidth is relatively narrow (e.g., the overall bandwidth is less than the threshold), the probability of finding times when all frequency segments in the plurality of frequency segments are idle is relatively high and benefits of synchronized transmissions may improve performance (e.g., overall throughput); whereas when the overall bandwidth is relatively wide (e.g., the overall bandwidth is greater than the threshold), the probability of finding times when all frequency segments in the plurality of frequency segments are idle is relatively low and benefits of synchronized transmissions will not outweigh performance degradation due increased failures to find times when all frequency segments are idle, according to an illustrative embodiment.

When it is determined at block 404 that simultaneous respective transmissions in the plurality of frequency segments are to be synchronized, the flow proceeds to block 408. At block 408, the AP 114 simultaneously transmits (e.g., the network interface device 122 simultaneously transmits, the PHY processor 130 simultaneously transmits, etc.) via the plurality of frequency segments in a synchronized manner. Simultaneously transmitting at block 408 comprises transmitting a first signal via a first frequency segment at a first time, and transmitting a second signal via a second frequency segment at the first time, according to an embodiment.

In some embodiments, prior to simultaneously transmitting in a synchronized manner at block 408, the AP 114 determines (e.g., the network interface device 122 determines, the MAC processor 126 determines, etc.) when the plurality of frequency segments are idle at a same time, and begins the simultaneous, synchronous transmission at block 408 after determining that the plurality of frequency segments are idle at the same time. In some embodiments, prior to simultaneously transmitting in a synchronized manner at block 408, the AP 114 waits (e.g., the network interface device 122 waits, the MAC processor 126 waits, etc.) until the plurality of frequency segments are all determined to be idle at the same time, and then begins the simultaneous, synchronous transmission at block 408.

In some embodiments, simultaneously transmitting at block 408 comprises transmitting signals such as described above with reference to FIG. 2A. In other embodiments, simultaneously transmitting at block 408 comprises transmitting signals such as described above with reference to FIG. 3A. In other embodiments, simultaneously transmitting at block 408 comprises transmitting other suitable signals having other suitable formats.

In some embodiments, simultaneously transmitting at block 408 comprises the multi-channel segment transmission controller 142 prompting the PHY processor 130 to begin the first transmission in the first frequency segment at the first time and to begin the second transmission in the second frequency segment at the first time.

On the other hand, when it is determined at block 404 that simultaneous respective transmissions in the plurality of frequency segments are to be unsynchronized, the flow proceeds to block 412. Simultaneously transmitting at block 412 comprises transmitting a third signal via a third frequency segment at a second time, and transmitting a fourth signal via a fourth frequency segment at a third time, according to an embodiment. In some embodiments, the third frequency segment is the first frequency segment (block 408), and the fourth frequency segment is the second frequency segment (block 408), according to an embodiment.

In some embodiments, unlike the synchronous transmissions at block 408, the AP 114 does not need to determine when the plurality of frequency segments are idle at a same time, or wait for a time when the plurality of frequency segments are idle at a same time, before a transmission at block 412 in one of the frequency segments can begin. For example, when the AP 114 determines (e.g., the network interface device 122 determines, the MAC processor 126 determines, etc.) that a first frequency segment among the plurality of frequency segments is idle, the AP 114 can begin transmitting (at block 412) in the first frequency segment even though the AP 114 determines (e.g., the network interface device 122 determines, the MAC processor 126 determines, etc.) that a second frequency segment among the plurality of frequency segments is not also idle at the same time, according to an embodiment. When the AP 114 later determines the second frequency segment has also become idle, the AP 114 can begin transmitting (at block 412) in the second frequency segment simultaneously with the transmission (at block 412) in the first frequency segment.

In some embodiments, simultaneously transmitting at block 412 comprises transmitting signals such as described above with reference to FIG. 2B. In other embodiments, simultaneously transmitting at block 412 comprises transmitting signals such as described above with reference to FIG. 3B. In other embodiments, simultaneously transmitting at block 412 comprises transmitting other suitable signals having other suitable formats.

In some embodiments, simultaneously transmitting at block 412 comprises the multi-channel segment transmission controller 142 prompting the PHY processor 130 to begin the third transmission in the third frequency segment at the second time and to begin the fourth transmission in the fourth frequency segment at the third time."

In some embodiments, the first frequency segment is the same as the third frequency segment, and the second frequency segment is the same as the fourth frequency segment. In other embodiments, the first frequency segment is different from the third frequency segment, and/or the second frequency segment is different from the fourth frequency segment.

In some embodiments, the first packet is the same as the third packet, and the second packet is the same as the fourth packet. In other embodiments, the first packet is different from the third packet, and/or the second packet is different from the fourth packet.

Figure 5:
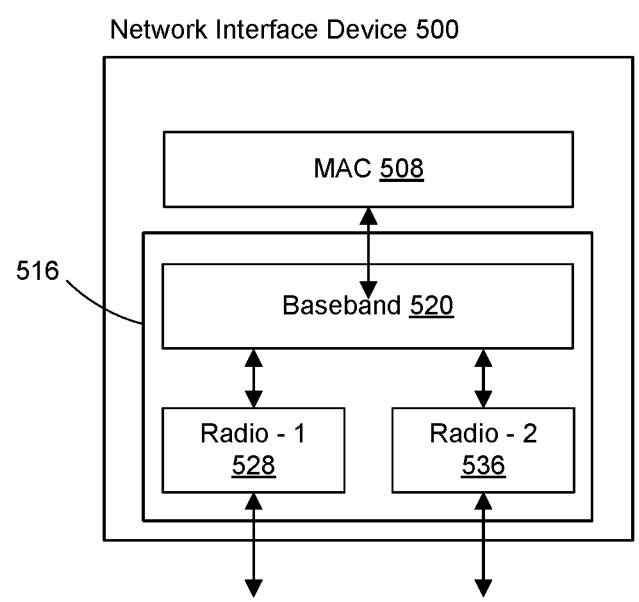
FIG. 5 is a diagram of an example network interface device configured for multi-channel segment operation, according to an embodiment.

FIG. 5 is a diagram of an example network interface device 500 configured for multi-channel segment operation, according to an embodiment. For instance, in an embodiment, the network interface device 500 is configured for synchronous and/or asynchronous transmission/reception over multiple frequency segments. In an embodiment, the network interface device 500 corresponds to the network interface device 122 of the AP 114 of FIG. 1. In another embodiment, the network interface device 500 corresponds to the network interface device 162 of the client station 154-1 of FIG. 1.

The network interface device 500 is configured for operation over two frequency segments. The network interface device 500 includes a MAC processor 508 coupled to a PHY processor 516. The MAC processor 508 exchanges frames (or PSDUs) with the PHY processor 516.

In an embodiment, the MAC processor 508 corresponds to the MAC processor 126 of FIG. 1. In another embodiment, the MAC processor 508 corresponds to the MAC processor 166 of FIG. 1. In an embodiment, the PHY processor 516 corresponds to the PHY processor 130 of FIG. 1. In another embodiment, the PHY processor 516 corresponds to the PHY processor 170 of FIG. 1.

The PHY processor 516 includes a single baseband signal processor 520. The single baseband signal processor 520 is coupled to a first RF radio (Radio-1) 528 and a second RF radio (Radio-2) 536. In an embodiment, the RF radio 528 and the RF radio 536 correspond to the transceivers 134 of FIG. 1. In another embodiment, the RF radio 528 and the RF radio 536 correspond to the transceivers 174 of FIG. 1. In an embodiment, the RF radio 528 is configured to operate on a first RF band, and the RF radio 536 is configured to operate on a second RF band. In another embodiment, the RF radio 528 and the RF radio 536 are both configured to operate on the same RF band.

In an embodiment, the MAC processor 508 generates data corresponding to MAC layer data units (e.g., frames) and provides the frames (or PSDUs) to the baseband signal processor 520. The baseband signal processor 520 is configured to receive frames (or PSDUs) from the MAC processor 508, and encapsulate the frames (or PSDUs) into respective packets and generate respective baseband signals corresponding to the respective packets. The baseband signal processor 520 provides the respective baseband signals to the Radio-1 528 and the Radio-2 536. The Radio-1 528 and Radio-2 536 upconvert the respective baseband signals to generate respective RF signals for transmission via the first frequency segment and the second frequency segment, respectively. The Radio-1 528 transmits a first RF signal via the first frequency segment and the Radio-2 536 transmits a second RF signal via the second frequency segment.

In some embodiments, the MAC processor 508 determines whether frames are to be transmitted synchronously or asynchronously, and informs the baseband signal processor 520 whether the frames are to be transmitted synchronously or asynchronously when providing the frames to the baseband signal processor 520. In some embodiments, the MAC processor 508 determines in which frequency segment a frame is to be transmitted, and informs the baseband signal processor 520 of the frequency segment in which the frame is to be transmitted when providing the frame to the baseband signal processor 520.

When the first RF signal and the second RF signal are to be synchronized, the baseband signal processor 520 is configured to ensure that respective transmitted signals over the first frequency segment and the second frequency segment are synchronized. For example, the baseband signal processor 520 is provide the respective baseband signals to the Radio-1 528 and the Radio-2 536 beginning at a same time.

The Radio-1 528 and the Radio-2 536 are also configured to receive respective RF signals via the first frequency segment and the second frequency segment, respectively. The Radio-1 528 and the Radio-2 536 generate respective baseband signals corresponding to the respective received signals. The generated respective baseband signals are provided to the baseband signal processor 520. The baseband signal processor 520 generates respective PSDUs corresponding to the respective received signals, and provides the PSDUs to the MAC processor 508. The MAC processor 508 processes the PSDUs received from the baseband signal processor 520.

FIG. 6A is a diagram of example PPDUs 604 and 608 transmitted in respective frequency segments, according to an embodiment. For example, PPDU 604 is transmitted in a first frequency segment and PPDU 608 is transmitted in a second frequency segment. In some embodiments and/or scenarios, the first frequency segment is separated in frequency from the second frequency segment by a gap in frequency. In other embodiments and/or scenarios, the first frequency segment is adjacent in frequency to the second frequency segment, and the first frequency segment is not separated in frequency from the second frequency segment.

In some embodiments, the PHY processor 130 (FIG. 1) is configured to generate and transmit the PPDUs 604 and 608. In some embodiments, the PHY processor 170 (FIG. 1) is configured to generate and transmit the PPDUs 604 and 608. In some embodiments, the baseband processor 520 (FIG. 5) is configured to generate the PPDUs 604 and 608 and the radios 528, 536 (FIG. 5) are configured to transmit the PPDUs 604 and 608.

The PPDU 604 includes a legacy PHY preamble 612 (sometimes referred to as a legacy preamble 612), a non-legacy PHY preamble (e.g., an EHT preamble) 616, and a PHY data portion 620. The legacy preamble 612 comprises a legacy short training field (L-STF) 624, a legacy long training field (L-LTF) 628, and a legacy signal field (L-SIG) 632. The L-SIG 632 includes a rate subfield (not shown) and a length subfield (not shown) that together indicate a duration of the PPDU 604. In some embodiments, the EHT preamble 616 includes PHY parameters regarding the PPDU 604 that are for use by receiver devices to properly process the PPDU 604, such as a modulation and coding scheme (MCS) subfield that indicates an MCS used for the PHY data portion 620. When the PPDU 604 is an MU PPDU, the EHT preamble 616 includes allocation information that indicates frequency resource unit (RU) allocation information, spatial stream allocation information, etc. In some embodiments, the EHT preamble 616 includes one or more long training fields, the number of which varies depending on how many spatial streams are used to transmit the PHY data portion 620.

The PPDU 608 includes a legacy preamble 642, a non-legacy PHY preamble (e.g., an EHT preamble) 646, and a PHY data portion 650. The legacy preamble 642 comprises an L-STF 654, an L-LTF 658, and an L-SIG 632. The L-SIG 632 includes a rate subfield (not shown) and a length subfield (not shown) that together indicate a duration of the PPDU 608. In some embodiments, the EHT preamble 646 includes PHY parameters regarding the PPDU 608 that are for use by receiver devices to properly process the PPDU 608, such as an MCS subfield that indicates an MCS used for the PHY data portion 650. When the PPDU 608 is an MU PPDU, the EHT preamble 646 includes allocation information that indicates frequency RU allocation information, spatial stream allocation information, etc. In some embodiments, the EHT preamble 646 includes one or more long training fields, the number of which varies depending on how many spatial streams are used to transmit the PHY data portion 650.

In some embodiments in which transmission of the PPDU 604 and the PPDU 608 is synchronized, the PPDU 608 includes a packet extension field 668 so that a duration of the PPDU 608 is the same as a duration of the PPDU 604. In other embodiments, the PHY data portion 650 additionally or alternatively includes padding as discussed above. In other embodiments, a signal extension is additionally or alternatively used for PPDU 608 so that receiver devices set their NAV counters to a value that indicates a duration that corresponds to a duration of the PPDU 604 as discussed above. In some embodiments in which transmission of the PPDU 604 and the PPDU 608 is asynchronous, the PPDU 608 does not include the packet extension field 668.

In some embodiments, a duration of the EHT preamble 616 is different (or is not required to be the same) as a duration of the EHT preamble 646. In other embodiments, the duration of the EHT preamble 616 is required to be the same as the duration of the EHT preamble 646 (e.g., padding bits are added (if needed) to the EHT preamble 646 so that a duration of the EHT preamble 646 is the same as the duration of the EHT preamble 616).

In embodiments in which the PPDU 604 has a different duration than the PPDU 608, the L-SIG 632 includes different information than the L-SIG 662. For example, the length subfield in the L-SIG 632 indicates a different length than the length subfield in the L-SIG 662.

FIG. 6B is a diagram of an example non-legacy preamble (e.g., an EHT preamble) 674 that is used as the non-legacy preamble 616 or the non-legacy preamble 646, according to some embodiments.

In some embodiments, the PHY processor 130 (FIG. 1) is configured to generate the non-legacy preamble 674. In some embodiments, the PHY processor 170 (FIG. 1) is configured to generate the non-legacy preamble 674. In some embodiments, the baseband processor 520 (FIG. 5) is configured to generate the non-legacy preamble 674.

The non-legacy preamble 674 includes a first signal field (EHT-SIGA) 678, a second signal field (EHT-SIGB) 682, a short training field (EHT-STF) 686, and one or more long training fields (EHT-LTFs) 690. In an embodiment, when a PHY data portion corresponding to the non-legacy preamble 674 is to be transmitted via n spatial streams (where n is a suitable positive integer), the non-legacy preamble 674 includes no more than n EHT-LTFs 690. In another embodiment, when a PHY data portion corresponding to the non-legacy preamble 674 is to be transmitted via n spatial streams, the non-legacy preamble 674 includes at least n EHT-LTFs 690.

In some embodiments, EHT-SIGB 682 is included for MU PPDUs and is not included for single user (SU) PPDUs.

In various embodiments, the EHT-SIGA 678 and/or the EHT-SIGB 682 indicate an MCS (or multiple MCSs for an MU PPDU) used for the PHY data portion corresponding to the non-legacy preamble 674. Thus, when different MCSs are used for different frequency segments, content of the EHT-SIGAs 678 in the different frequency segments is different.

Similarly, when different numbers of spatial streams are used for different frequency segments, the number of EHT-LTFs 690 in the different frequency segments is different, at least in some embodiments.

Referring now to FIGS. 6A-B, in embodiments in which the L-SIG 632 and the L-SIG 662 include different information, a duplicate of the L-SIG 632 is transmitted in each subchannel (e.g., each 20 MHz subchannel) of the first frequency segment, and a duplicate of the L-SIG 662 is transmitted in each subchannel (e.g., each 20 MHz subchannel) of the second frequency segment. In embodiments in which one or more subchannels in a frequency segment are punctured (e.g., not used for transmission), a duplicate of the L-SIG 632/662 is not transmitted in punctured subchannels.

In embodiments in which the non-legacy signal field 678 includes different information in different frequency segments, a duplicate of the non-legacy signal field 678 that includes information for the first frequency segment is transmitted in each subchannel (e.g., each 20 MHz subchannel) of the first frequency segment, and a duplicate of the non-legacy signal field 678 that includes information for the second frequency segment is transmitted in each subchannel (e.g., each 20 MHz subchannel) of the second frequency segment. In embodiments in which one or more subchannels in a frequency segment are punctured (e.g., not used for transmission), a duplicate of the non-legacy signal field 678 is not transmitted in punctured subchannels.

Similarly, in embodiments in which the non-legacy signal field 682 includes different information in different frequency segments, a duplicate of the non-legacy signal field 682 that includes information for the first frequency segment is transmitted in each subchannel (e.g., each 20 MHz subchannel) of the first frequency segment, and a duplicate of the non-legacy signal field 682 that includes information for the second frequency segment is transmitted in each subchannel (e.g., each 20 MHz subchannel) of the second frequency segment. In embodiments in which one or more subchannels in a frequency segment are punctured (e.g., not used for transmission), a duplicate of the non-legacy signal field 682 is not transmitted in punctured subchannels.

In some embodiments (e.g., in which the PPDU 604 is a MU PPDU and the PPDU 608 is an SU PPDU), a duplicate of the non-legacy signal field 682 that includes information for the first frequency segment is transmitted in each subchannel (e.g., each 20 MHz subchannel) of the first frequency segment, and the non-legacy signal field 682 is not transmitted in the second frequency segment.

In some embodiments, the non-legacy signal field 678 includes a bandwidth subfield 694 that indicates an overall bandwidth of only the frequency segment in which the PPDU 604/608 is transmitted. For example, when the PPDU 604 is transmitted in a first frequency segment having an overall bandwidth of 160 MHz and the PPDU 608 is transmitted in a second frequency segment having an overall bandwidth of 40 MHZ, the bandwidth subfield 694 in the PPDU 604 indicates a bandwidth of 160 MHz, whereas the bandwidth subfield 694 in the PPDU 608 indicates a bandwidth of 40 MHz.

In some embodiments, the non-legacy signal field 678 includes a frequency segment identifier (ID) subfield 698 that indicates the frequency segment in which the PPDU 604/608 is transmitted. For example, when the PPDU 604 is transmitted in a first frequency segment and the PPDU 608 is transmitted in a second frequency segment, the frequency segment ID subfield 698 in the PPDU 604 indicates the first frequency segment, whereas the frequency segment ID subfield 698 in the PPDU 608 indicates the second frequency segment.

In some embodiments, the non-legacy signal field 678 also includes one or more other subfields (not shown) that indicate one or more of: i) whether a simultaneous transmission is occurring in any other frequency segment(s), ii) a number of other frequency segments in which the simultaneous transmission is occurring, iii) respective overall frequency bandwidth(s) of the other frequency segment(s), and iv) a cumulative frequency bandwidth of all of the frequency segments in which simultaneous transmissions are occurring.

In some embodiments, legacy preambles and non-legacy preambles having formats such as discussed above with reference to FIGS. 6A-B are used with the transmissions discussed above with reference to FIGS. 2A-B and 3A-B.

Although certain orderings of fields and subfields are illustrated in FIGS. 6A-B, in other embodiments, other suitable orderings fields and subfields are utilized. In other embodiments, PHY preambles include one or more other suitable fields/subfields in addition to the fields and subfields illustrated in FIGS. 6A-B. Similarly, in some embodiments, one or more of the fields/subfields illustrated in FIGS. 6A-B are omitted.

Embodiment 1: A method for simultaneously transmitting in a plurality of frequency segments, comprising: determining, at a communication device, whether simultaneous transmissions in a first frequency segment and a second frequency segment are to be synchronized in time; in response to the communication device determining that simultaneous transmissions in the first frequency segment and the second frequency segment are to be synchronized in time, transmitting a first packet in the first frequency segment beginning at a first time, and transmitting a second packet in the second frequency segment beginning at the first time; and in response to the communication device determining that simultaneous transmissions in the first frequency segment and the second frequency segment are to be unsynchronized in time, transmitting a third packet in the first frequency segment beginning at a second time, and transmitting a fourth packet in the second frequency segment beginning at a third time that is different than the second time.

Embodiment 2. The method of embodiment 1, wherein determining whether simultaneous transmissions in the first frequency segment and the second frequency segment are to be synchronized in time comprises: determining whether simultaneous transmissions in the first frequency segment and the second frequency segment are to be synchronized in time based on a frequency bandwidth of a frequency gap between the first frequency segment and the second frequency segment.

Embodiment 3. The method of embodiment 2, wherein determining whether simultaneous transmissions in the first frequency segment and the second frequency segment are to be synchronized in time comprises: comparing, at the communication device, the frequency bandwidth of the frequency gap to a threshold; determining that simultaneous transmissions in the first frequency segment and the second frequency segment are to be synchronized in time in response to determining that the frequency bandwidth of the frequency gap is less than the threshold; and determining that simultaneous transmissions in the first frequency segment and the second frequency segment are to be unsynchronized in time in response to determining that the frequency bandwidth of the frequency gap is greater than the threshold.

Embodiment 4. The method of either of embodiments 1 or 2, wherein determining whether simultaneous transmissions in the first frequency segment and the second frequency segment are to be synchronized in time comprises: determining whether simultaneous transmissions in the first frequency segment and the second frequency segment are to be synchronized in time based on capabilities of one or more other communication devices that are to receive the simultaneous transmissions.

Embodiment 5. The method of embodiment 4, wherein determining whether simultaneous transmissions in the first frequency segment and the second frequency segment are to be synchronized in time comprises: determining whether any of the one or more other communication devices are not capable of processing unsynchronized transmissions in multiple frequency segments; determining that simultaneous transmissions in the first frequency segment and the second frequency segment are to be synchronized in time in response to determining that at least one of the one or more other communication devices is not capable of processing unsynchronized transmissions in multiple frequency segments; and determining that simultaneous transmissions in the first frequency segment and the second frequency segment are to be unsynchronized in time in response to determining that all of the one or more other communication devices are capable of processing unsynchronized transmissions in multiple frequency segments.

Embodiment 6. The method of any of embodiments 1, 2, or 4, wherein determining whether simultaneous transmissions in the first frequency segment and the second frequency segment are to be synchronized comprises: determining whether simultaneous transmissions in the first frequency segment and the second frequency segment are to be synchronized based on one or more of i) an overall frequency bandwidth of the first frequency segment, ii) an overall frequency bandwidth of the second frequency segment, and iii) a cumulative frequency bandwidth of the overall frequency bandwidth of the first frequency segment and the overall frequency bandwidth of the second frequency segment.

Embodiment 7. The method of any of embodiments 1-6, further comprising: generating the first packet to have a first physical layer (PHY) preamble with a first duration; and generating the second packet to have a second PHY preamble with a second duration that is different than the first duration.

Embodiment 8. The method of embodiment 7, further comprising: generating the first PHY preamble to include different information than the second PHY preamble.

Embodiment 9. The method of any of embodiments 1-8, generating the second packet comprises: generating the second packet to include a packet extension field so that transmission of the second packet ends when transmission of the first packet ends.

Embodiment 10. The method of any of embodiments 1-9, wherein: when the first packet and the second packet are transmitted: generating, at the communication device, a first medium access control (MAC) layer data unit, generating the first packet to include the first MAC layer data unit, generating, at the communication device, a second MAC layer data unit, generating the second packet to include the second MAC layer data unit; and when the third packet and the fourth packet are transmitted: generating, at the communication device, a third MAC layer data unit, generating the third packet to include the third MAC layer data unit, generating, at the communication device, a fourth MAC layer data unit, and generating the second packet to include the fourth MAC layer data unit.

Embodiment 11. The method of any of embodiments 1-10, wherein: when the first packet and the second packet are transmitted: transmitting the first packet via a first number of spatial streams, and transmitting the second packet via a second number of spatial streams that is different than the first number of spatial streams; and when the third packet and the fourth packet are transmitted: transmitting the third packet via a third number of spatial streams, and transmitting the fourth packet via a fourth number of spatial streams that is different than the third number of spatial streams.

Embodiment 12. A communication device, comprising: a wireless network interface device comprising: one or more integrated circuit (IC) devices, and a plurality of radio frequency (RF) radios including at least a first RF radio and a second RF radio, wherein the plurality of RF radios are implemented at least partially on the one or more IC devices; wherein the one or more IC devices are configured to implement any of the methods of embodiments 1-11.

Embodiment 13. A communication device, comprising: a wireless network interface device comprising: one or more integrated circuit (IC) devices, and a plurality of radio frequency (RF) radios including at least a first RF radio and a second RF radio, wherein the plurality of RF radios are implemented at least partially on the one or more IC devices. The one or more IC devices are configured to: determine whether simultaneous transmissions in a first frequency segment and a second frequency segment are to be synchronized; and in response to the communication device determining that simultaneous transmissions in the first frequency segment and the second frequency segment are to be synchronized, control the first RF radio to transmit a first packet in the first frequency segment beginning at a first time, and control the second RF radio to transmit a second packet in the second frequency segment beginning at the first time. The one or more IC devices are further configured to: in response to the communication device determining that simultaneous transmissions in the first frequency segment and the second frequency segment are to be unsynchronized, control the first RF radio to transmit a third packet in the first frequency segment beginning at a second time, and control the second RF radio to transmit a fourth packet in the second frequency segment beginning at a third time that is different than the second time.

Embodiment 14. The communication device of embodiment 13, wherein the one or more IC devices are further configured to: determine whether simultaneous transmissions in the first frequency segment and the second frequency segment are to be synchronized based on a frequency bandwidth of a frequency gap between the first frequency segment and the second frequency segment.

Embodiment 15. The communication device of embodiment 14, wherein the one or more IC devices are further configured to: compare the frequency bandwidth of the frequency gap to a threshold; determine that simultaneous transmissions in the first frequency segment and the second frequency segment are to be synchronized in response to determining that the frequency bandwidth of the frequency gap is less than the threshold; and determine that simultaneous transmissions in the first frequency segment and the second frequency segment are to be unsynchronized in response to determining that the frequency bandwidth of the frequency gap is greater than the threshold.

Embodiment 16. The communication device of any of embodiments 13-15, wherein the one or more IC devices are further configured to: determine whether simultaneous transmissions in the first frequency segment and the second frequency segment are to be synchronized based on capabilities of one or more other communication devices that are to receive the simultaneous transmissions.

Embodiment 17. The communication device of any of embodiments 13-16, wherein the one or more IC devices are further configured to: determine whether simultaneous transmissions in the first frequency segment and the second frequency segment are to be synchronized based on one or more of i) an overall frequency bandwidth of the first frequency segment, ii) an overall frequency bandwidth of the second frequency segment, and iii) a cumulative frequency bandwidth of the overall frequency bandwidth of the first frequency segment and the overall frequency bandwidth of the second frequency segment.

Embodiment 18. The communication device of any of embodiments 13-17, wherein the one or more IC devices are further configured to: generate the first packet to have a first physical layer (PHY) preamble with a first duration; and generate the second packet to have a second PHY preamble with a second duration that is different than the first duration.

Embodiment 19. The communication device of claim 18, wherein the one or more IC devices are further configured to: generate the first PHY preamble to include different information than the second PHY preamble.

Embodiment 20. The communication device of any of embodiments 13-19, wherein the one or more IC devices are further configured to: generate the second packet to include a packet extension field so that transmission of the second packet ends when transmission of the first packet ends.

Embodiment 21. The communication device of any of embodiments 13-20, wherein the one or more IC devices are further configured to: when the first packet and the second packet are transmitted: generate a first medium access control (MAC) layer data unit, generate the first packet to include the first MAC layer data unit, generate a second MAC layer data unit, and generate the second packet to include the second MAC layer data unit. The one or more IC devices are further configured to: when the third packet and the fourth packet are transmitted: generate a third MAC layer data unit, generate the third packet to include the third MAC layer data unit, generate a fourth MAC layer data unit, and generate the second packet to include the fourth MAC layer data unit.

Embodiment 22. The communication device of embodiment 21, wherein the wireless network interface device comprises: a single media access control (MAC) layer processor implemented on the one or more IC devices; a baseband signal processor implemented on the one or more IC devices, wherein the baseband signal processor is coupled to the single MAC processor and to the plurality of RF radios; and wherein when the first packet and the second packet are transmitted: the single MAC layer processor is configured to generate the first MAC layer data unit and the second MAC layer data unit, and the baseband processor is configured to generate the first packet and the second packet; wherein when the third packet and the fourth packet are transmitted: the single MAC layer processor is configured to generate the third MAC layer data unit and the fourth MAC layer data unit, and the baseband processor is configured to generate the third packet and the fourth packet.

Embodiment 23. The communication device of any of embodiments 13-122, wherein the one or more IC devices are further configured to: when the first packet and the second packet are transmitted: control the first RF radio to transmit the first packet via a first number of spatial streams, and control the second RF radio to transmit the second packet via a second number of spatial streams that is different than the first number of spatial streams; and when the third packet and the fourth packet are transmitted: control the first RF radio to transmit the third packet via a third number of spatial streams, and control the second RF radio to transmit the fourth packet via a fourth number of spatial streams that is different than the third number of spatial streams.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneously transmitting in a plurality of frequency segments in a wireless local area network (WLAN), comprising:
    determining, at a communication device, whether simultaneous transmissions in a first frequency segment and a second frequency segment are to be synchronized in time based on capabilities of one or more other communication devices in the WLAN;
    in response to the communication device determining that simultaneous transmissions in the first frequency segment and the second frequency segment are to be synchronized in time,
        transmitting a first packet in the first frequency segment beginning at a first time, and
        transmitting a second packet in the second frequency segment beginning at the first time; and
    in response to the communication device determining that simultaneous transmissions in the first frequency segment and the second frequency segment are to be unsynchronized in time,
        transmitting a third packet in the first frequency segment beginning at a second time, and
        transmitting a fourth packet in the second frequency segment beginning at a third time that is different than the second time.

2. The method of claim 1, wherein determining whether simultaneous transmissions in the first frequency segment and the second frequency segment are to be synchronized in time comprises:
    determining whether simultaneous transmissions in the first frequency segment and the second frequency segment are to be synchronized in time based on capabilities of one or more other communication devices that are to receive the simultaneous transmissions.

3. The method of claim 1, wherein determining whether simultaneous transmissions in the first frequency segment and the second frequency segment are to be synchronized in time comprises:
    determining whether simultaneous transmissions in the first frequency segment and the second frequency segment are to be synchronized in time further based on a frequency bandwidth of a frequency gap between the first frequency segment and the second frequency segment.

4. The method of claim 1, wherein determining whether simultaneous transmissions in the first frequency segment and the second frequency segment are to be synchronized comprises:
    determining whether simultaneous transmissions in the first frequency segment and the second frequency segment are to be synchronized further based on one or more of i) an overall frequency bandwidth of the first frequency segment, ii) an overall frequency bandwidth of the second frequency segment, and iii) a cumulative frequency bandwidth of the overall frequency bandwidth of the first frequency segment and the overall frequency bandwidth of the second frequency segment.

5. The method of claim 1, further comprising:
    when the first packet and the second packet are transmitted,
        generating the first packet to include a first physical layer (PHY) preamble having a first duration, and
        generating the second packet to include a second PHY preamble having a second duration that is different than the first duration; and
    when the third packet and the fourth packet are transmitted,
        generating the third packet to include a third PHY preamble having a third duration, and
        generating the fourth packet to include a fourth PHY preamble having a fourth duration that is different than the third duration.

6. The method of claim 1, further comprising:
    when the first packet and the second packet are transmitted,
        modulating a first signal corresponding to the first packet according to a first modulation scheme, and
        modulating a second signal corresponding to the second packet according to a second modulation scheme that is different than the first modulation scheme; and
    when the third packet and the fourth packet are transmitted,
        modulating a third signal corresponding to the third packet according to a third modulation scheme, and
        modulating a fourth signal corresponding to the fourth packet according to a fourth modulation scheme that is different than the third modulation scheme.

7. The method of claim 1, further comprising:
    when the first packet and the second packet are transmitted,
        generating the first packet to include a first physical layer (PHY) preamble having a first indication of a first overall bandwidth of a first communication channel in the first frequency segment, and
        generating the second packet to include a second PHY preamble having a second indication of a second overall bandwidth of a second communication channel in the second frequency segment, the second overall bandwidth being different than the first overall bandwidth; and
    when the third packet and the fourth packet are transmitted,
        generating the third packet to include a third PHY preamble having the first indication of the first overall bandwidth of the first communication channel, and
        generating the fourth packet to include a fourth PHY preamble having the second indication of the second overall bandwidth of the second communication channel.

8. The method of claim 1, further comprising:
    when the first packet and the second packet are transmitted, and in response to the communication device determining that simultaneous transmissions in the first frequency segment and the second frequency segment are to have synchronized end times,
        synchronizing an end of transmission of the first packet with an end of transmission of the second packet.

9. The method of claim 1, wherein:
when the first packet and the second packet are transmitted:
generating, at the communication device, a first medium access control (MAC) layer data unit,
generating the first packet to include the first MAC layer data unit,
generating, at the communication device, a second MAC layer data unit,
generating the second packet to include the second MAC layer data unit; and
when the third packet and the fourth packet are transmitted:
generating, at the communication device, a third MAC layer data unit,
generating the third packet to include the third MAC layer data unit,
generating, at the communication device, a fourth MAC layer data unit,
generating the second packet to include the fourth MAC layer data unit.

10. The method of claim 1, wherein:
when the first packet and the second packet are transmitted:
transmitting the first packet via a first number of spatial streams, and
transmitting the second packet via a second number of spatial streams that is different than the first number of spatial streams; and
when the third packet and the fourth packet are transmitted:
transmitting the third packet via a third number of spatial streams, and
transmitting the fourth packet via a fourth number of spatial streams that is different than the third number of spatial streams.

11. A communication device, comprising:
a wireless network interface device comprising:
one or more integrated circuit (IC) devices, and
a plurality of radio frequency (RF) radios including at least a first RF radio and a second RF radio, wherein the plurality of RF radios are implemented at least partially on the one or more IC devices;
wherein the one or more IC devices are configured to:
determine whether simultaneous transmissions in a first frequency segment and a second frequency segment are to be synchronized in time based on capabilities of one or more other communication devices in the WLAN, and
in response to the one or more IC devices determining that simultaneous transmissions in the first frequency segment and the second frequency segment are to be synchronized in time,
control the first RF radio to transmit a first packet in the first frequency segment beginning at a first time, and
control the second RF radio to transmit a second packet in the second frequency segment beginning at the first time; and
wherein the one or more IC devices are further configured to:
in response to the one or more IC devices determining that simultaneous transmissions in the first frequency segment and the second frequency segment are to be unsynchronized in time,
control the first RF radio to transmit a third packet in the first frequency segment beginning at a second time, and
control the second RF radio to transmit a fourth packet in the second frequency segment beginning at a third time that is different than the second time.

12. The communication device of claim 11, wherein the one or more IC devices are configured to:
determine whether simultaneous transmissions in the first frequency segment and the second frequency segment are to be synchronized in time based on capabilities of one or more other communication devices that are to receive the simultaneous transmissions.

13. The communication device of claim 11, wherein the one or more IC devices are configured to:
determine whether simultaneous transmissions in the first frequency segment and the second frequency segment are to be synchronized in time further based on a frequency bandwidth of a frequency gap between the first frequency segment and the second frequency segment.

14. The communication device of claim 11, wherein the one or more IC devices are configured to:
determine whether simultaneous transmissions in the first frequency segment and the second frequency segment are to be synchronized further based on one or more of i) an overall frequency bandwidth of the first frequency segment, ii) an overall frequency bandwidth of the second frequency segment, and iii) a cumulative frequency bandwidth of the overall frequency bandwidth of the first frequency segment and the overall frequency bandwidth of the second frequency segment.

15. The communication device of claim 11, wherein the one or more IC devices are further configured to:
when the first packet and the second packet are transmitted,
generate the first packet to include a first physical layer (PHY) preamble having a first duration, and
generate the second packet to include a second PHY preamble having a second duration that is different than the first duration; and
when the third packet and the fourth packet are transmitted,
generate the third packet to include a third PHY preamble having a third duration, and
generate the fourth packet to include a fourth PHY preamble having a fourth duration that is different than the third duration.

16. The communication device of claim 11, wherein the one or more IC devices are further configured to:
when the first packet and the second packet are transmitted,
modulate a first signal corresponding to the first packet according to a first modulation scheme, and
modulate a second signal corresponding to the second packet according to a second modulation scheme that is different than the first modulation scheme; and
when the third packet and the fourth packet are transmitted,
modulate a third signal corresponding to the third packet according to a third modulation scheme, and
modulate a fourth signal corresponding to the fourth packet according to a fourth modulation scheme that is different than the third modulation scheme.

17. The communication device of claim 11, wherein the one or more IC devices are further configured to:
- when the first packet and the second packet are transmitted,
  - generate the first packet to include a first physical layer (PHY) preamble having a first indication of a first overall bandwidth of a first communication channel in the first frequency segment, and
  - generate the second packet to include a second PHY preamble having a second indication of a second overall bandwidth of a second communication channel in the second frequency segment, the second overall bandwidth being different than the first overall bandwidth; and
- when the third packet and the fourth packet are transmitted,
  - generate the third packet to include a third PHY preamble having the first indication of the first overall bandwidth of the first communication channel, and
  - generate the fourth packet to include a fourth PHY preamble having the second indication of the second overall bandwidth of the second communication channel.

18. The communication device of claim 11, wherein the one or more IC devices are further configured to:
- when the first packet and the second packet are transmitted, and in response to the one or more IC devices determining that simultaneous transmissions in the first frequency segment and the second frequency segment are to have synchronized end times,
  - synchronize an end of transmission of the first packet with an end of transmission of the second packet.

19. The communication device of claim 11, wherein the one or more IC devices are further configured to:
- when the first packet and the second packet are transmitted:
  - generate a first medium access control (MAC) layer data unit,
  - generate the first packet to include the first MAC layer data unit,
  - generate a second MAC layer data unit, and
  - generate the second packet to include the second MAC layer data unit; and
- when the third packet and the fourth packet are transmitted:
  - generate a third MAC layer data unit,
  - generate the third packet to include the third MAC layer data unit,
  - generate a fourth MAC layer data unit, and
  - generate the second packet to include the fourth MAC layer data unit.

20. The communication device of claim 19, wherein the wireless network interface device comprises:
- a single media access control (MAC) layer processor implemented on the one or more IC devices;
- a baseband signal processor implemented on the one or more IC devices, wherein the baseband signal processor is coupled to the single MAC processor and to the plurality of RF radios; and
- wherein when the first packet and the second packet are transmitted:
  - the single MAC layer processor is configured to generate the first MAC layer data unit and the second MAC layer data unit, and
  - the baseband processor is configured to generate the first packet and the second packet;
- wherein when the third packet and the fourth packet are transmitted:
  - the single MAC layer processor is configured to generate the third MAC layer data unit and the fourth MAC layer data unit, and
  - the baseband processor is configured to generate the third packet and the fourth packet.

21. The communication device of claim 11, wherein the one or more IC devices are further configured to:
- when the first packet and the second packet are transmitted:
  - control the wireless network interface device to transmit the first packet via a first number of spatial streams, and
  - control the wireless network interface device to transmit the second packet via a second number of spatial streams that is different than the first number of spatial streams; and
- when the third packet and the fourth packet are transmitted:
  - control the wireless network interface device to transmit the third packet via a third number of spatial streams, and
  - control the wireless network interface device to transmit the fourth packet via a fourth number of spatial streams that is different than the third number of spatial streams.

* * * * *